(12) United States Patent
Tanaka et al.

(10) Patent No.: US 7,284,811 B2
(45) Date of Patent: Oct. 23, 2007

(54) RECORDING APPARATUS AND METHOD FOR CONTROLLING RECORDING APPARATUS

(75) Inventors: Souhei Tanaka, Kanagawa (JP); Akira Kuronuma, Tokyo (JP); Toru Nakayama, Kanagawa (JP); Tetsushi Kono, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1008 days.

(21) Appl. No.: 10/413,146

(22) Filed: Apr. 15, 2003

(65) Prior Publication Data

US 2003/0193691 A1  Oct. 16, 2003

(30) Foreign Application Priority Data

Apr. 15, 2002 (JP) ............................ 2002-112661
Jul. 18, 2002 (JP) ............................ 2002-210161

(51) Int. Cl.
*B41J 2/205* (2006.01)
(52) U.S. Cl. .......................................... 347/15; 358/1.2
(58) Field of Classification Search ................ 347/15; 358/1.2, 1.9, 2.1, 426.05, 426.06, 1.16
See application file for complete search history.

(56) References Cited

U.S. PATENT DOCUMENTS

| 4,313,124 A | 1/1982 | Hara |
|---|---|---|
| 4,345,262 A | 8/1982 | Shirato et al. |
| 4,459,600 A | 7/1984 | Sato et al. |
| 4,463,359 A | 7/1984 | Ayata et al. |
| 4,558,333 A | 12/1985 | Sugitani et al. |
| 4,608,577 A | 8/1986 | Hori |
| 4,723,129 A | 2/1988 | Endo et al. |
| 4,740,796 A | 4/1988 | Endo et al. |
| 5,412,483 A | 5/1995 | Ludlow et al. |
| 5,436,863 A | 7/1995 | Kogure |
| 5,751,327 A | 5/1998 | De Cock et al. |
| 5,838,888 A | 11/1998 | Oda ........................ 358/1.16 |
| 5,914,731 A | 6/1999 | Yano et al. .................. 347/9 |
| 5,923,344 A | 7/1999 | Norum et al. |
| 6,036,297 A | 3/2000 | Hayasaki |
| 6,097,499 A | 8/2000 | Casey et al. |
| 6,120,129 A | 9/2000 | Iwasaki et al. |

(Continued)

FOREIGN PATENT DOCUMENTS

EP  0 709 214  5/1996

(Continued)

*Primary Examiner*—Lamson Nguyen
(74) *Attorney, Agent, or Firm*—Fitzpatrick, Cella, Harper & Scinto

(57) ABSTRACT

A recording apparatus has a buffer for dividing a storage area into a plurality of areas in a scanning direction of a recording head to record data by allowing a carriage loaded with the recording head to scan data on a record medium, and storing the divided image data in a divided area unit, and includes: a write control unit for controlling write address information about image data in the area unit for data of each color for storage of the image data divided in an area unit in the buffer; a read control unit for controlling for data of each color read address information for a read of image data stored in the buffer; and a record data generation unit for generating record data in a unit of the divided area based on the read image data according to the read address information.

16 Claims, 23 Drawing Sheets

U.S. PATENT DOCUMENTS

| | | |
|---|---|---|
| 6,261,010 B1 | 7/2001 | Maeda |
| 6,328,403 B1 | 12/2001 | Iwasaki et al. |
| 6,896,345 B2 * | 5/2005 | Nakayama et al. ............ 347/5 |
| 2001/0005211 A1 | 6/2001 | Minowa |
| 2002/0191068 A1 | 12/2002 | O'Hara et al. |

FOREIGN PATENT DOCUMENTS

| | | |
|---|---|---|
| EP | 0 802 503 | 10/1997 |
| EP | 1 120 253 | 8/2001 |
| JP | 54-56847 | 5/1979 |
| JP | 58-146929 | 9/1983 |
| JP | 59-121432 | 7/1984 |
| JP | 59-123670 | 7/1984 |
| JP | 59-138461 | 8/1984 |
| JP | 60-71260 | 4/1985 |
| JP | 11-192746 | 7/1999 |
| JP | 11-259248 | 9/1999 |

\* cited by examiner

FIG. 3

| | FIRST BLOCK | SECOND BLOCK | THIRD BLOCK | FOURTH BLOCK | FIFTH BLOCK | SIXTH BLOCK | SEVENTH BLOCK | EIGHTH BLOCK |
|---|---|---|---|---|---|---|---|---|
| | FIRST COLOR DATA | FIRST COLOR DATA | FIRST COLOR DATA | FIRST COLOR DATA | FIRST COLOR DATA | FIRST COLOR DATA | FIRST COLOR DATA | FIRST COLOR DATA |
| | SECOND COLOR DATA | SECOND COLOR DATA | SECOND COLOR DATA | SECOND COLOR DATA | SECOND COLOR DATA | SECOND COLOR DATA | SECOND COLOR DATA | SECOND COLOR DATA |
| | THIRD COLOR DATA | THIRD COLOR DATA | THIRD COLOR DATA | THIRD COLOR DATA | THIRD COLOR DATA | THIRD COLOR DATA | THIRD COLOR DATA | THIRD COLOR DATA |
| | FOURTH COLOR DATA | FOURTH COLOR DATA | FOURTH COLOR DATA | FOURTH COLOR DATA | FOURTH COLOR DATA | FOURTH COLOR DATA | FOURTH COLOR DATA | FOURTH COLOR DATA |
| | FIFTH COLOR DATA | FIFTH COLOR DATA | FIFTH COLOR DATA | FIFTH COLOR DATA | FIFTH COLOR DATA | FIFTH COLOR DATA | FIFTH COLOR DATA | FIFTH COLOR DATA |
| | SIXTH COLOR DATA | SIXTH COLOR DATA | SIXTH COLOR DATA | SIXTH COLOR DATA | SIXTH COLOR DATA | SIXTH COLOR DATA | SIXTH COLOR DATA | SIXTH COLOR DATA |
| | SEVENTH COLOR DATA | SEVENTH COLOR DATA | SEVENTH COLOR DATA | SEVENTH COLOR DATA | SEVENTH COLOR DATA | SEVENTH COLOR DATA | SEVENTH COLOR DATA | SEVENTH COLOR DATA |
| | EIGHTH COLOR DATA | EIGHTH COLOR DATA | EIGHTH COLOR DATA | EIGHTH COLOR DATA | EIGHTH COLOR DATA | EIGHTH COLOR DATA | EIGHTH COLOR DATA | EIGHTH COLOR DATA |

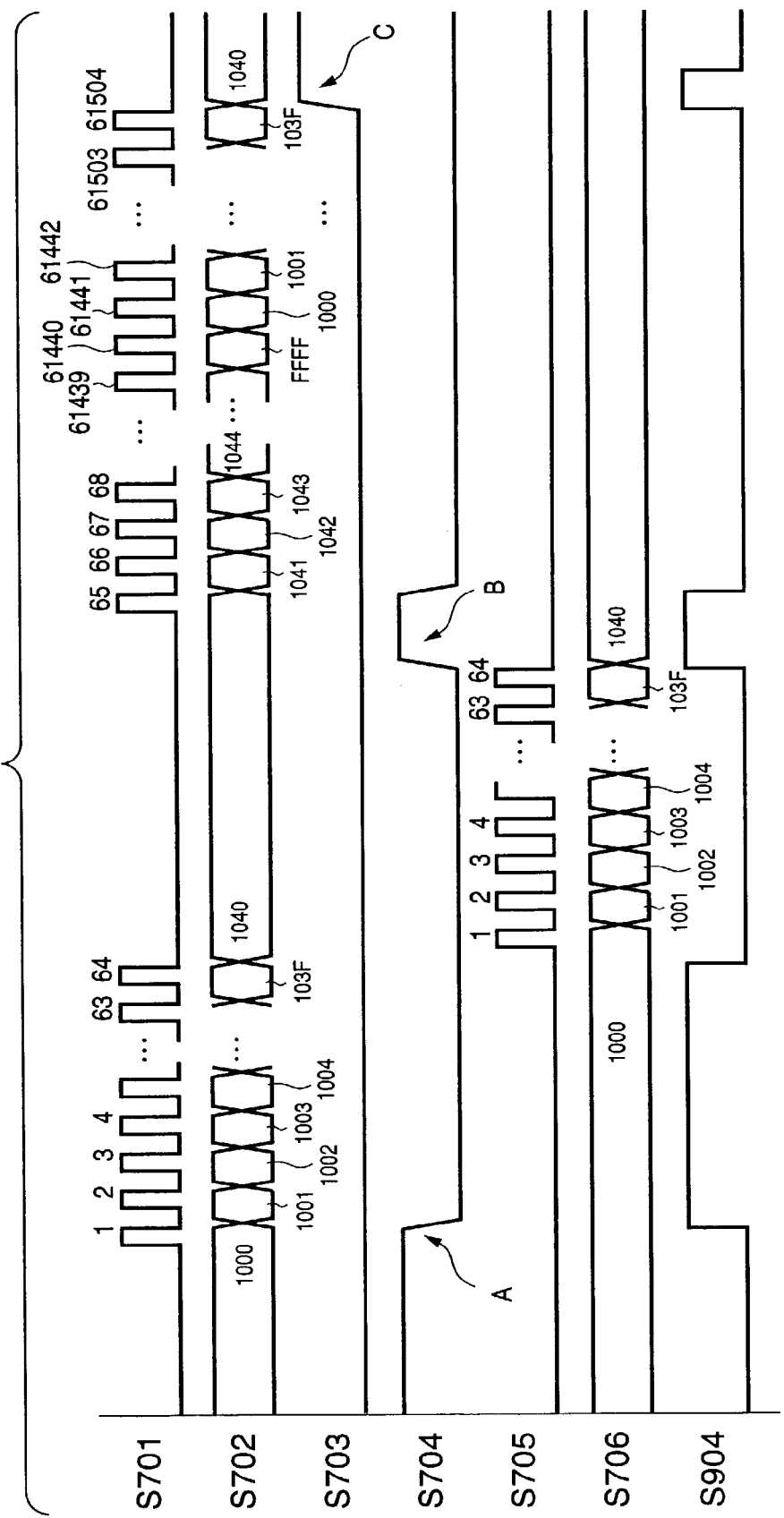

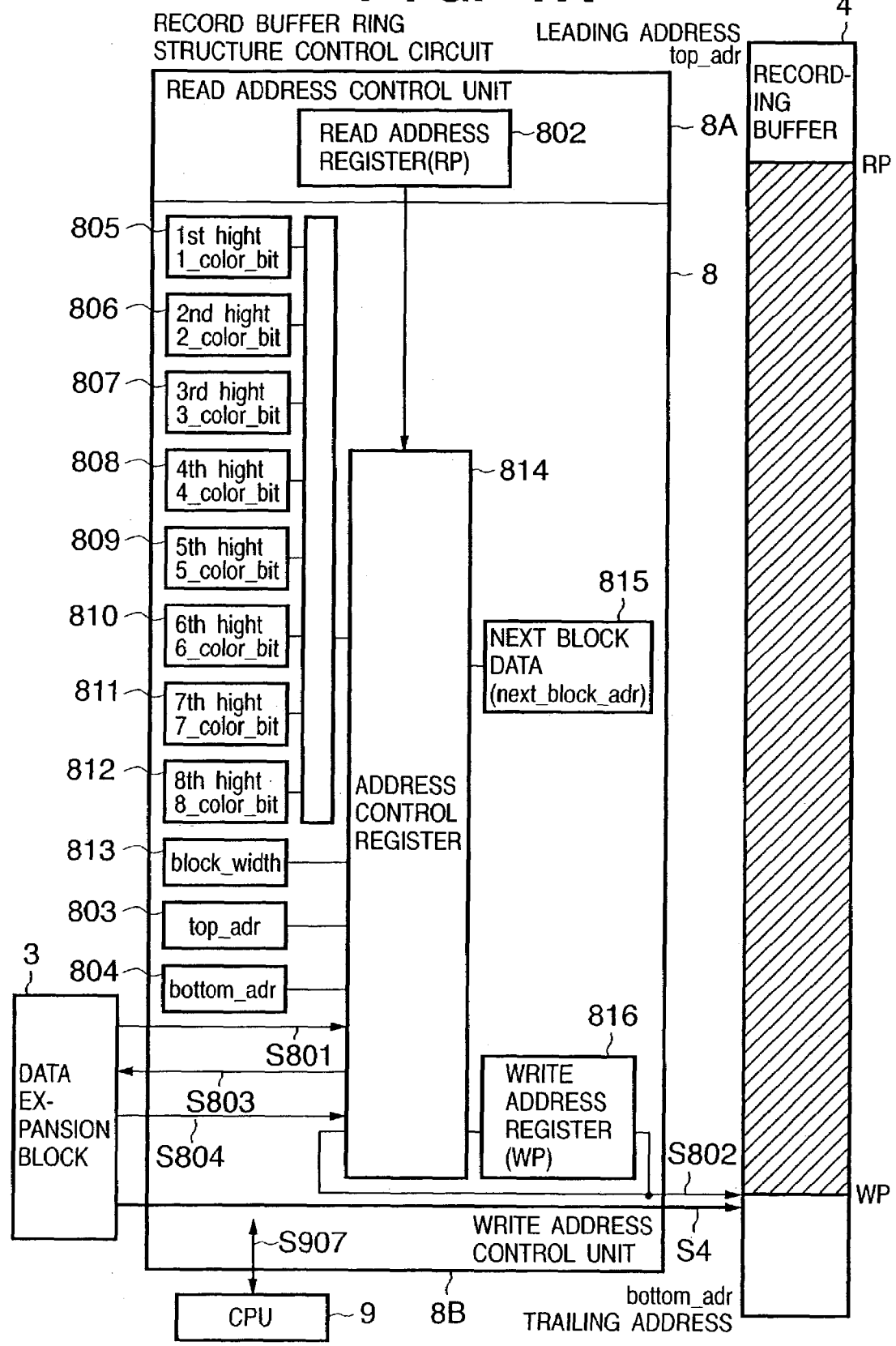

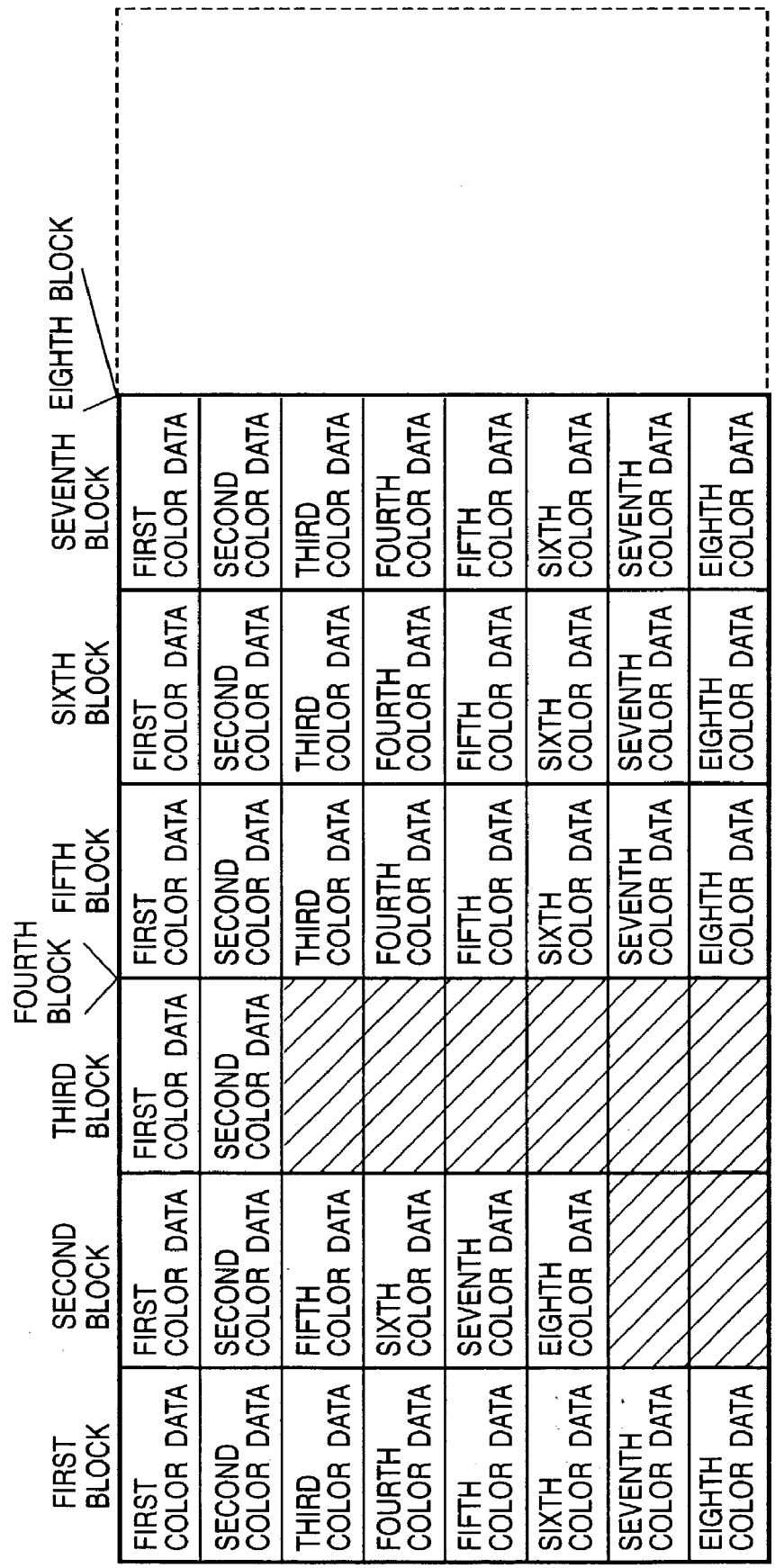

FIG. 9B

| FIRST BLOCK | SECOND BLOCK | THIRD BLOCK | FOURTH BLOCK | FIFTH BLOCK | SIXTH BLOCK | SEVENTH BLOCK | EIGHTH BLOCK |
|---|---|---|---|---|---|---|---|
| FIRST COLOR DATA | FIRST COLOR DATA | FIRST COLOR DATA | FIRST COLOR DATA | FIRST COLOR DATA | FIRST COLOR DATA | |
| SECOND COLOR DATA | SECOND COLOR DATA | SECOND COLOR DATA | SECOND COLOR DATA | SECOND COLOR DATA | SECOND COLOR DATA | |
| THIRD COLOR DATA | FIFTH COLOR DATA | /// | THIRD COLOR DATA | THIRD COLOR DATA | THIRD COLOR DATA | |
| FOURTH COLOR DATA | SIXTH COLOR DATA | /// | FOURTH COLOR DATA | FOURTH COLOR DATA | FOURTH COLOR DATA | |
| FIFTH COLOR DATA | SEVENTH COLOR DATA | /// | FIFTH COLOR DATA | FIFTH COLOR DATA | FIFTH COLOR DATA | |
| SIXTH COLOR DATA | EIGHTH COLOR DATA | /// | SIXTH COLOR DATA | SIXTH COLOR DATA | SIXTH COLOR DATA | |
| SEVENTH COLOR DATA | /// | /// | SEVENTH COLOR DATA | SEVENTH COLOR DATA | SEVENTH COLOR DATA | |
| EIGHTH COLOR DATA | /// | /// | EIGHTH COLOR DATA | EIGHTH COLOR DATA | EIGHTH COLOR DATA | |

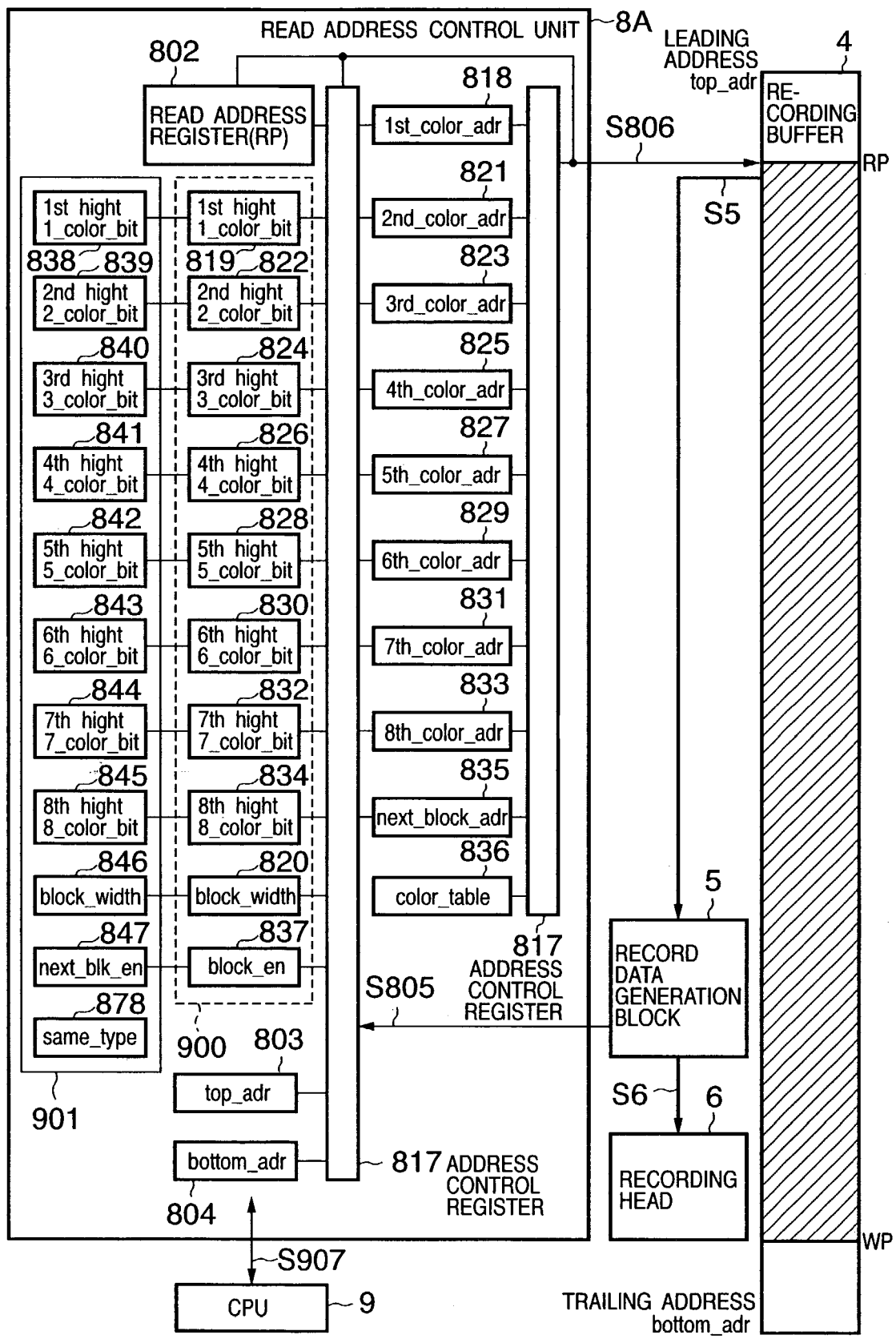

RECORDING APPARATUS AND METHOD FOR CONTROLLING RECORDING APPARATUS

FIELD OF THE INVENTION

The present invention relates to a recording apparatus and a method for controlling the recording apparatus, or the like.

BACKGROUND OF THE INVENTION

Relating to a printing apparatus, the conventional technology using a ring structure for a recording buffer is suggested in Japanese Patent Laid-Open No. 59-121432. The conventional technology is configured by an address pointer for storage of print data in a memory area, an address pointer for retrieval of data, and a print data count register for management of a blank area in the memory area with a view to efficiently using the memory of a cyclic area.

However, when a common ring buffer structure in the conventional technology is applied to a recording apparatus for full-color printing, it can be successfully applied to the recording head of one color, but there occurs the problem with the recording heads of other plural colors that data storage areas cannot be sufficiently reserved.

Furthermore, although a multicolor ring buffer structure is configured, the buffer structure is first assigned to each color. Therefore, it is necessary to prepare an area although there is no data to be printed. As a result, an efficient use of a memory area is next to impossible.

SUMMARY OF THE INVENTION

To solve the above-mentioned problem, the recording apparatus and the method for controlling the recording apparatus or the like includes the following configuration. That is, a recording apparatus has a buffer for dividing a storage area into a plurality of areas in a scanning direction of a recording head to record data by allowing a carriage loaded with the recording head to scan data on a record medium, and storing the divided image data in a divided area unit, and includes: a write control unit for controlling write address information about image data in the area unit for data of each color for storage of the image data divided in an area unit in the buffer; a read control unit for controlling read address information for a read of image data stored in the buffer for data of each color; and record data generation means for generating record data in a unit of the divided area based on the read image data according to the read address information.

A method for controlling a recording apparatus having a buffer for dividing a storage area into a plurality of areas in a scanning direction of a recording head to record data by allowing a carriage loaded with the recording head to scan data on a record medium, storing the divided image data in a divided area unit, and includes: a receiving step of receiving information transmitted from external equipment, dividing a record area in the received information into a plurality of areas, and processing data separately between image data in a unit of the divided area and setting information for control of a write and a read of the image data; a setting step of setting information about data of each color contained in the image data in the area unit in a register of a write control unit and a read control unit according to the setting information; a first controlling step of generating address information for a writing process on the image data in the area unit according to the information for the data of each color set in the register; a second controlling step of generating address information for a read of the image data handled in the writing process according to the information for the data of each color set in the register; and a record data generating step for generating record data in the divided area unit according to the read image data.

A recording apparatus has a buffer for dividing a storage area into a plurality of areas in a scanning direction of a recording head to record data by allowing a carriage loaded with the recording head to scan data on a record medium, storing the divided image data in a divided area unit, and includes: a write control unit for controlling write address information about image data in the area unit for data of each color based on information for switch of a data storage area for data of each color and a result of comparison between an available remainder of the buffer and an update amount of a write address when image data divided in an area unit is stored in the buffer; a read control unit for controlling read address information for a read of image data stored in the buffer; and record data generation means for generating record data in a unit of the divided area based on the read image data according to the read address information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 shows the data structure of the recording buffer storing image data;

FIG. 6 is an explanatory view of the operation timing of the reception buffer ring structure control circuit;

FIGS. 7A and 7B show an explanatory view of the record buffer ring structure control circuit;

FIGS. 9A and 9B are explanatory views of the structure of the image data stored in the recording buffer;

FIG. 10 is an explanatory view of the record Buffer ring structure control circuit;

DETAILED DESCRIPTION OF THE PREFERRED EMBODIMENTS

Preferred embodiments of the present invention will now be described in detail in accordance with the accompanying drawings.

Preferred embodiments of the present invention are described below in detail by referring to the attached drawings.

In the following embodiments, a printer is explained as a recording apparatus in the inkjet recording system.

In the present specifications, "recording" (also described as "printing") refers to not only representing significant information such as characters, graphics, etc. but also representing widely an image, design, pattern, etc. in a record medium regardless of significance, or of visual or sensible representation, and processing a medium.

Furthermore, a "record medium" refers to not only a paper sheet used in a common recording apparatus, but also any substance which receives ink such as a cloth, a plastic film, a metal plate, glass, ceramics, wood, leather, etc.

Additionally, "ink" (can be called "liquid") is to be widely interpreted as the above-mentioned "recording (printing)", and refers to a liquid to be supplied in forming an image, design, pattern, etc., processing a record medium, or processing ink (for example, setting or insolubilizing color elements in the ink applied to the record medium) when it is applied to the record medium.

<Outline of the Body of the Apparatus>

Figure 19:
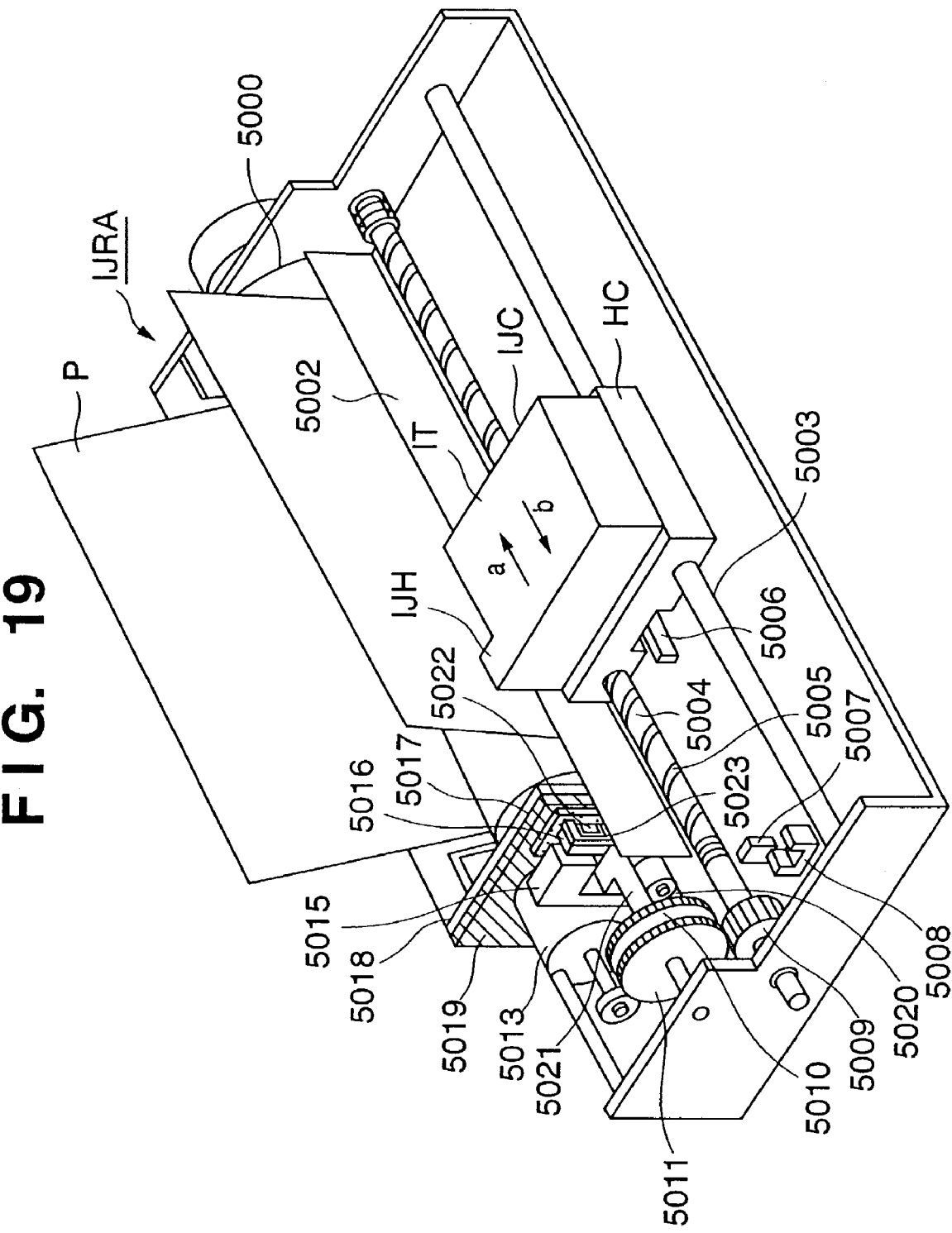
FIG. 19 shows the appearance of the printer according to an embodiment of the present invention.

FIG. 19 is an oblique view of the outline of the configuration of the inkjet printer IJRA according to a typical embodiment of the present invention. In FIG. 19, a carriage HC engaged with a spiral groove 5005 of a lead screw 5004 rotating in cooperation with the normal and reverse rotations of a drive motor 5013 through driving force transmission gears 5009 to 5011 has a pin (not shown in the attached drawings), and is supported by a guide rail 5003 to move forward and backward in the directions indicated by the arrows a and b. The carriage HC is loaded with an ink cartridge IJH into which a recording head IJH and an ink tank IT are incorporated.

A sheet holder plate 5002 presses a recording sheet P against a platen 5000 in the movement direction of the carriage HC. Photo couplers 5007 and 5008 are home position detectors for confirming the presence of a lever 5006 of the carriage and switching the rotation direction of the drive motor 5013.

A member 5016 supports a cap member 5022 for capping the front of the recording head IJH, and a sucker 5015 performs a sucking operation inside the cap, and performs a sucking recovery on the recording head through an intra-cap opening 5023.

A member 5019 enables a cleaning blade 5017 to move back and forth, and a body support plate 5018 supports them.

It is obvious that the blade can be applied to the present embodiment in any well-known configurations.

Furthermore, a lever 5021 starts the sucking operation for a sucking recovery, and moves with the movement of a cam 5020 engaged with the carriage, and the driving force from the drive motor is controlled by the well-known transmission system such as a clutch, etc.

These capping, cleaning, and sucking recovery processes are configured such that a desired process can be performed in a corresponding position by the operation of the lead screw 5004 when the carriage reaches the area of the home position. However, the present embodiment can be applied so long as a desired operation can be performed at a common timing.

Although the ink tank IT and the recording head IJH can be incorporated into a unit to configure an exchangeable ink cartridge IJC, the ink tank IT can be separate from the recording head IJH to allow only the ink tank IT to be exchanged with a new one when the ink runs out.

Figure 20:
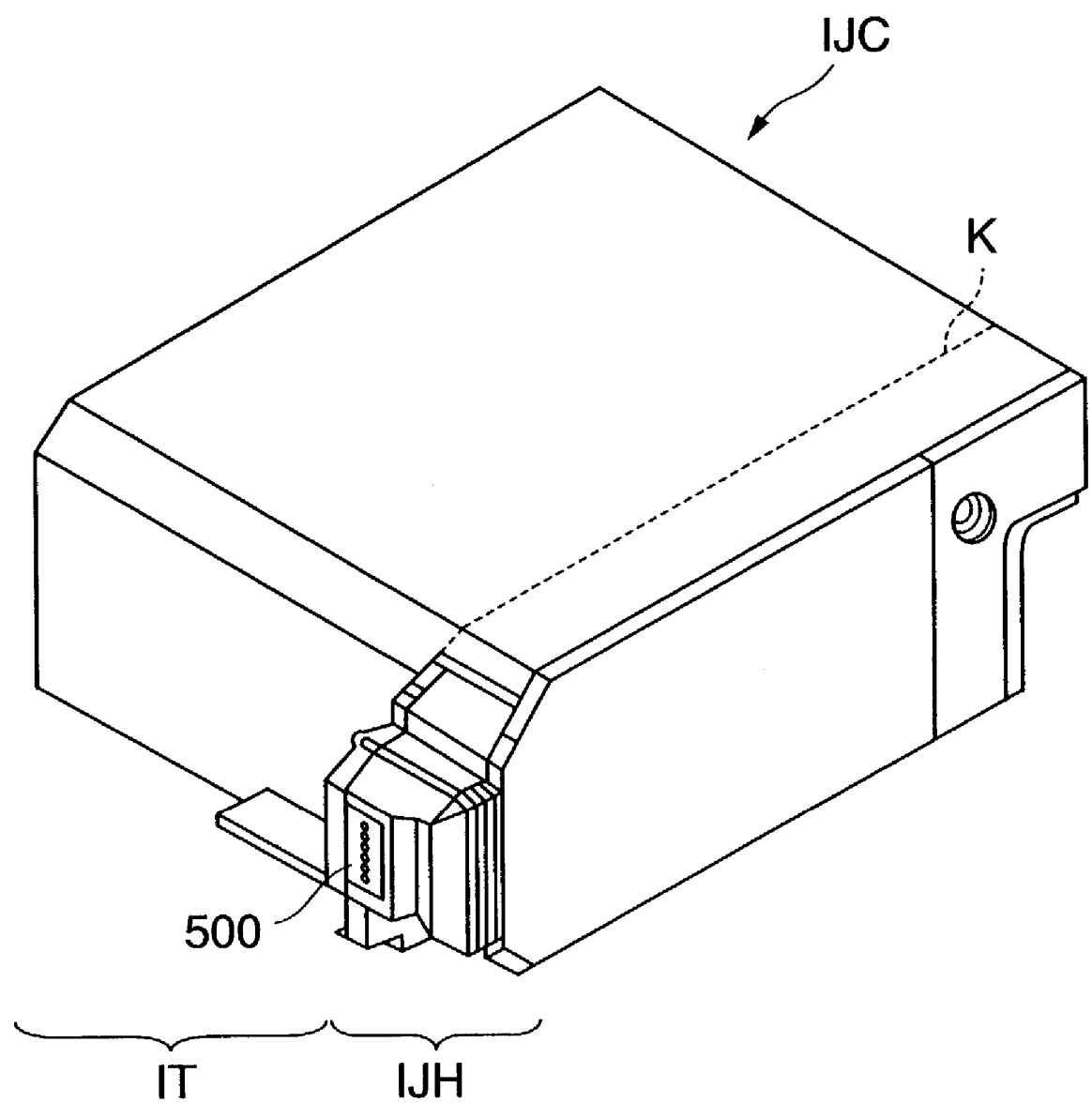
FIG. 20 shows an inkjet cartridge of the printer shown in FIG. 19.

FIG. 20 is an oblique view of the configuration of the ink cartridge IJC with which the ink tank can be separate from the head. With the ink cartridge IJC, the ink tank IT can be separate from the recording head IJH in the position of the boundary line K as shown in FIG. 20. If the ink cartridge IJC is provided for the carriage HC, it is provided with an electrode (not shown in the attached drawings) for receiving an electric signal provided from the carriage HC, and the recording head IJH is driven as described above according to the electric signal, thereby jetting ink.

In FIG. 20, reference numeral 500 denotes an ink nozzle array. The ink tank IT is provided with a fabric or porous ink absorber for holding ink.

Described below is the control configuration for execution of the record control of the above-mentioned apparatus.

First Embodiment

The first embodiment of the present invention is described below by referring to the attached drawings.

Figure 1:
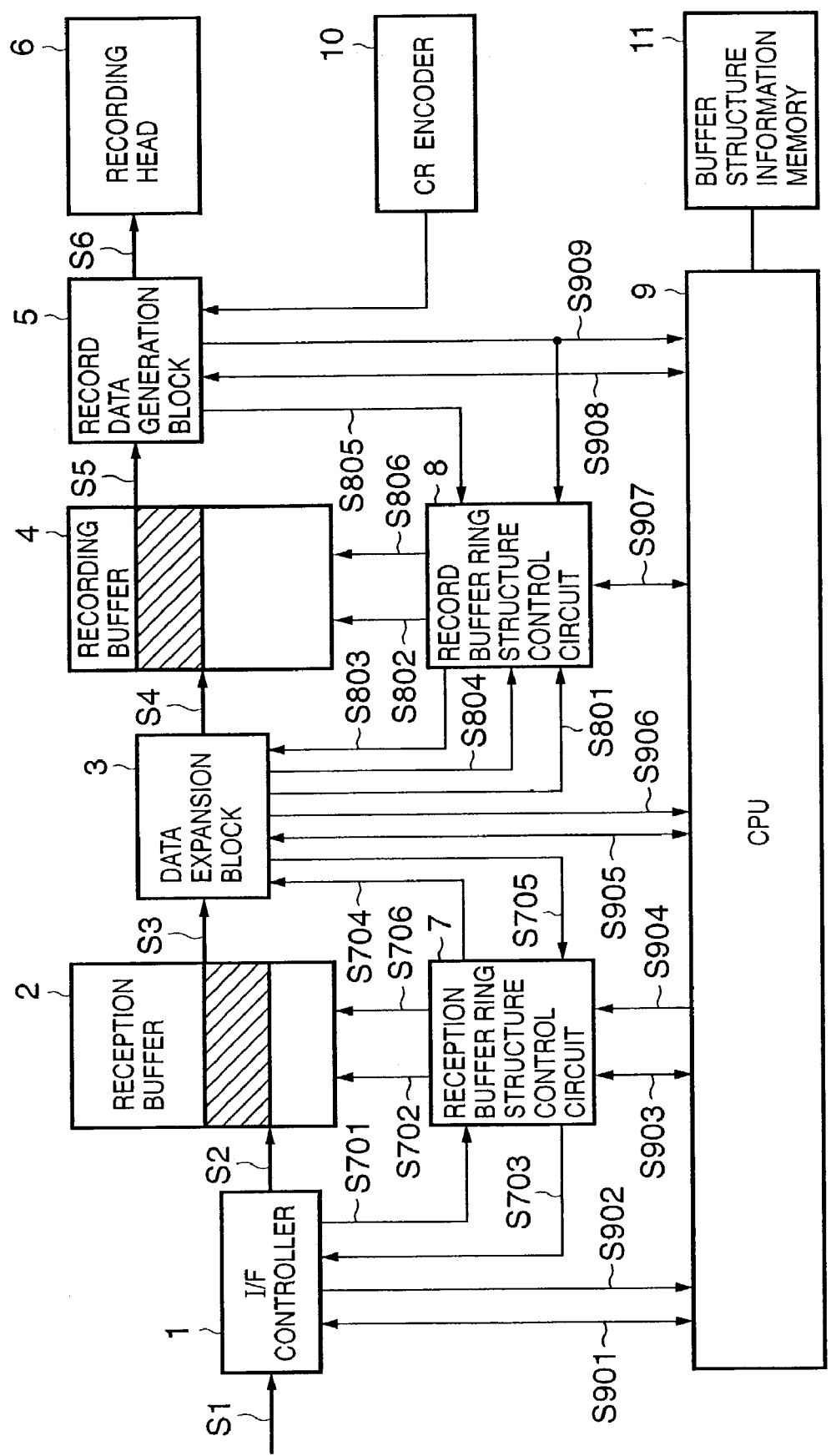
FIG. 1 is a block diagram of the record control unit of a recording apparatus according to an embodiment of the present invention.
Figure 5:
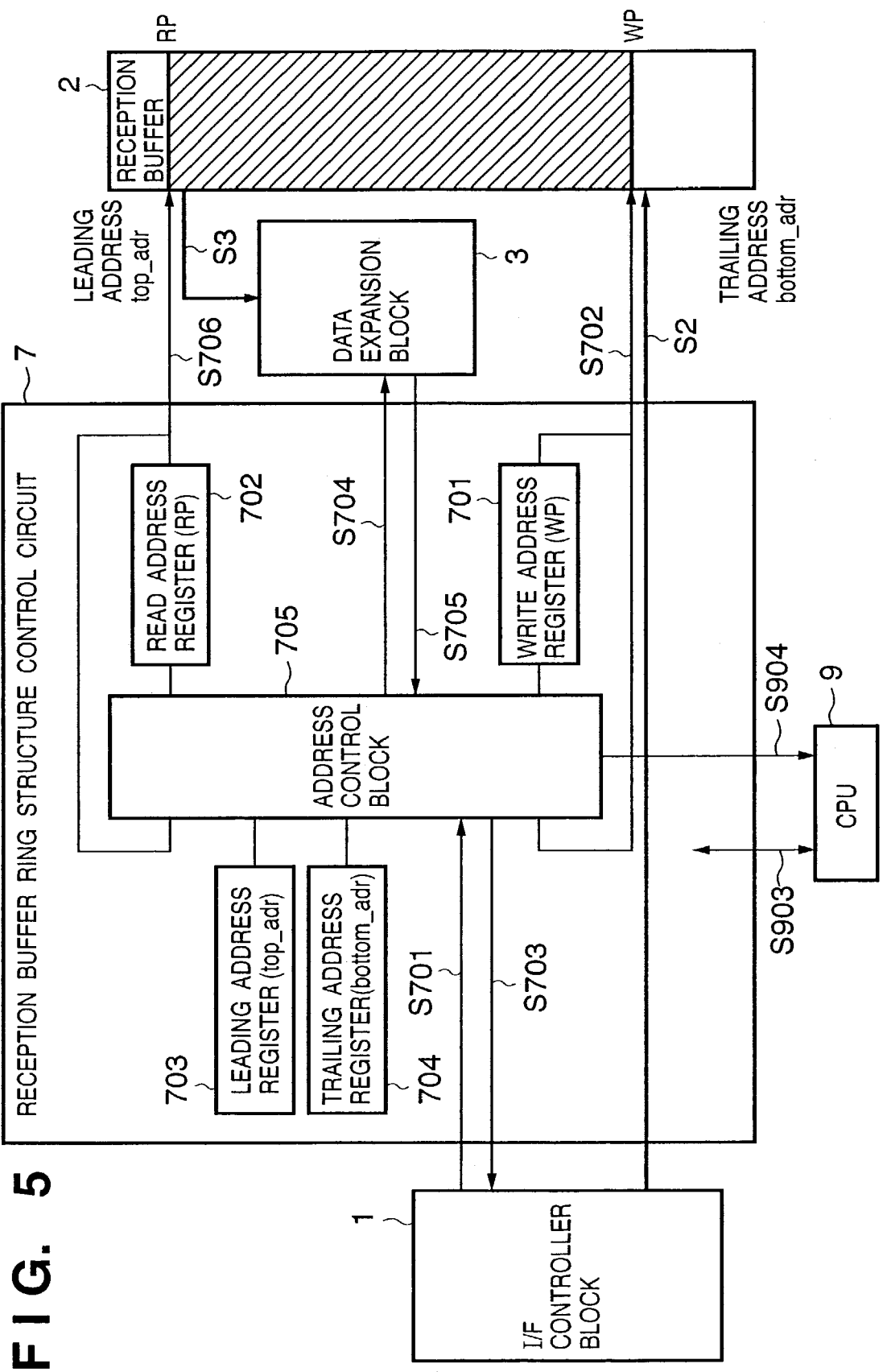
FIG. 5 is a detailed block diagram of the reception buffer ring structure control circuit 7.

FIG. 1 is a block diagram of the record control unit of the recording apparatus according to an embodiment of the recording apparatus of the present invention. In FIG. 5, an interface controller 1 receives data transferred from the host computer (not shown in the attached drawings) through an interface signal line S1, extracts necessary data for the operations of the recording apparatus and image data, and temporarily stores the data. The data extracted by the interface controller 1 is stored in a reception buffer 2 through a signal line S2.

Figures 2A, 2B:
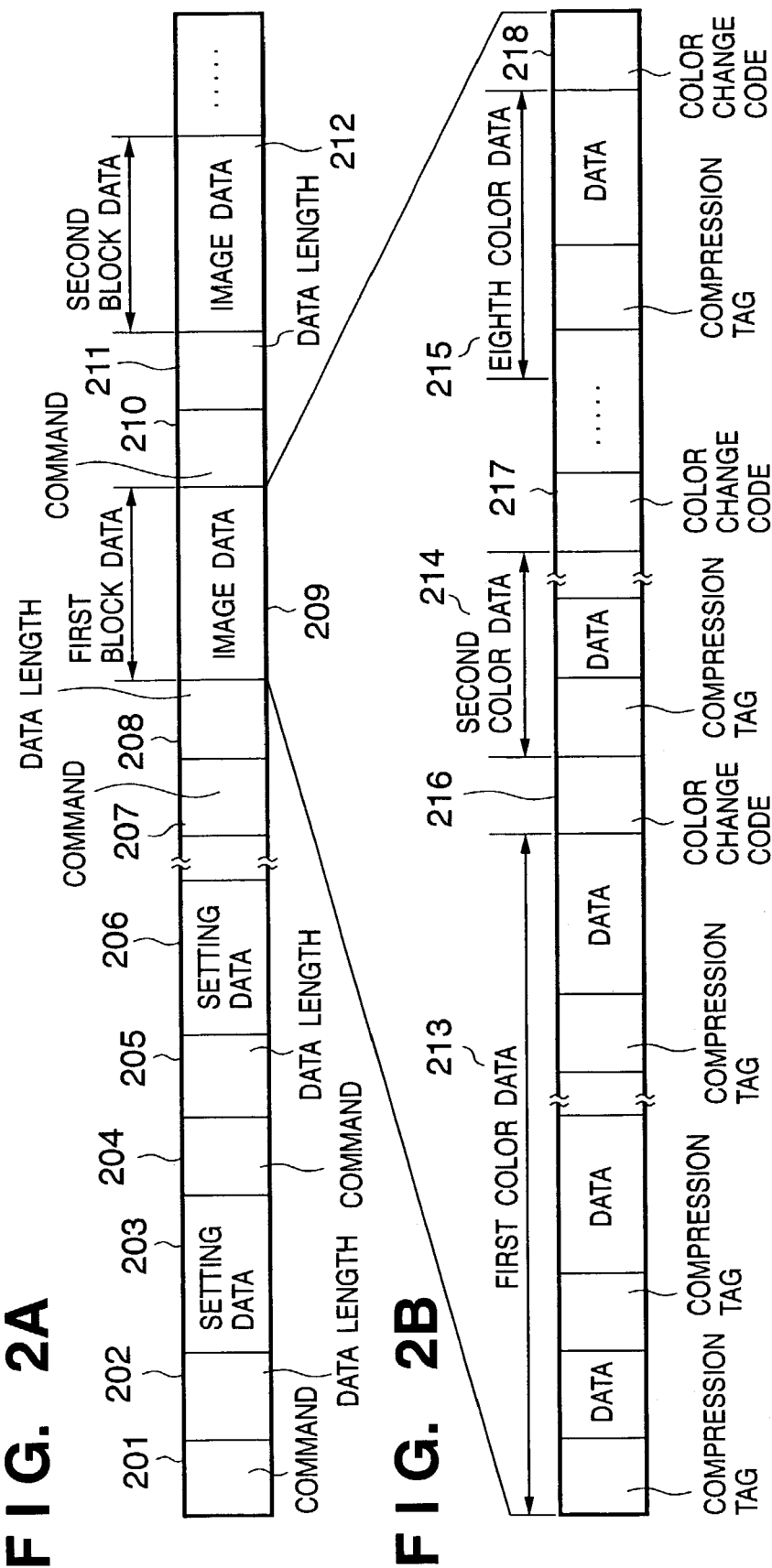
FIGS. 2A and 2B show the data structure when the data transferred from the host computer is stored in the reception buffer.

The reception buffer 2 is configured by a recording apparatus such as SRAM, DRAM, etc and the data stored in the reception buffer has the structure as shown in FIGS. 2A and 2B. The reception buffer 2 has ring structure.

FIG. 2A shows the contents of the data stored in the reception buffer. In FIG. 2A, the data is stored in the sequence of a "command" (201), a "data length" (202), and "setting data" (203), followed by a"command" (204), a"data length" (205), "setting data" (206) from left to right. The data transferred in a time series are stored at the consecutive addresses in the reception buffer, and the setting data 206 is the information about the execution of feeding sheets, the setting of sheet feeding, an available recording head, etc., and all information defined by the setting data is required in recording by the recording apparatus. Afterwards, image data (209, 212) to be recorded are stored in the reception buffer 2.

The image data (209, 212) are obtained by dividing the data amount required by the recording head recording data in one scanning operation into a smaller amount of data in a block unit. The image data is segmented in the block unit, and is stored sequentially as the first block data (209), the second block data (212), . . .

FIG. 2B shows the detailed data structure of the image data divided in a block unit. As shown in FIG. 2B, data of a plurality of colors (213 to 214) are sequentially stored as respectively compressed data. The color data is segmented by color change code (216, 217, and 218).

For example, if the color data of four colors of cyan, yellow, magenta, and black is assumed, and a recording head has two nozzle array each having vertical 64 nozzles for each color arranged in the scanning direction, then the data in a nozzle array unit forms one piece of color data. Therefore, two nozzle array for four colors, that is, the compressed color data of the first color to the eighth color are stored as the image data in one block data. Each nozzle of the nozzle array is arranged in the transfer direction of a recorded medium. For example, the first color and the second color represent cyan data, the third color and the fourth color represent magenta data, the fifth color and the sixth color represent yellow data, and the seventh color and the eighth color represent black data.

FIG. 3 shows the data structure of a recording buffer for holding image data. For example, if the maximum length of 8 inch is recorded in one scanning operation in the scanning direction, a piece of block data can be recorded in 1-inch size in the scanning direction, and a total of 8-block image data is recorded, then an image of one scanning operation is completed. The first block to the eighth block are arranged in the scanning direction of the recording head, and each piece of block data stores the first color data to the eighth color data. The length of the data of each color stored in each block corresponds to the number of nozzles of the recording head.

Back to FIG. 1, each control block is explained below. In the data stored in the reception buffer 2, the "command", "data length", and "setting data" which are the set values for control of the recording apparatus are read from the interface controller 1 to a CPU 9 through the signal line S902, and set in each control circuit (7, 8) shown in FIG. 1 (S903, S907). The CPU 9 interprets the read data (data corresponding to 201 to 208 shown in FIG. 2A), and totally controls the record of the recording apparatus based on the interpretation result. On the other hand, the CPU 9 activates a data expansion block 3 for processing image data.

The data expansion block 3 reads three types of data, that is, "compression TAG", "data", and "color change code" shown in FIG. 2B, from the reception buffer 2, and performs data expanding(storing) control based on the read data. According to the present embodiment, PackBits compression is used as a data compression/decompression method. Therefore, when the compression TAG is 8 bits from 00 h to 7F h, the process is performed with 1 to 128 pieces of non-consecutive data assumed to be stored in the data area, and when the compression TAG is 8 bits from FF h to 81 h, the subsequent 1-byte data is decompressed into 2 to 128 consecutive data. When 80 h is read at the compression TAG, it is processed as a color change code. The decompressed data is transmitted through a signal line S4, and written to the recording buffer 4.

The recording buffer 4 has ring structure. The recording buffer 4 stores decompressed image data in the data structure shown in FIG. 3. At the leading address of the recording buffer 4, the leading data of the first color data in the first block is written, and the subsequent data is sequentially written with one address added. The area storing color data at the address of the recording buffer can be determined by the setting data first read by the CPU 9, and no data exceeding the value can be written. Therefore, when image data is compressed, restrictions on data size are placed depending on the setting data. The data after detection of a color change code is sequentially written from the leading address of the second color data. The control of the address data is performed by the record buffer ring structure control circuit 8 described later.

The writing operation is repeated from the first color data to the eighth color data in the first block. When the eighth color data is completely written and a color change code is detected, the data in the first block is completely written. The data expansion block 3 completes the data expanding operation, notifies by interruption (INT 3) the CPU 9 of the completion of the data expansion for one block, and awaits the activation of the next data expansion by the CPU 9.

When a plurality of blocks of image data are prepared in a recording buffer 4, the CPU 9 operates a scan motor (not shown) to start the recording operation, transfers and records the image data in synchronization with a carriage encoder (CR encoder) 10 while a recording head 6 is scanning data, and completes an image on the recording sheet (recorded medium). After the recording head 6 scans in relation to recording sheet in the main scanning direction, the transfer means transfers the recorded medium in the sub scanning direction. Thus, the scanning of the recording head and the transfer of the recorded medium are repeatedly performed to record an image of one page.

The record data generation block 5 reads each block structure of the image data in the recording buffer 4 at a timing in synchronization with the CR encoder 10 through the signal line S5 based on the value specified by the CPU 9, and outputs the read data to the signal line S6 while converting the data into the data structure recordable by the recording head 6. The record data generation block 5 holds the information about the block width in the recording buffer (indicating the length of a block) described later, and the information about the height of each color of the block (referred to the "number of rasters" of color data)

<Write/Read Control of Reception Buffer>

As described above, the interface controller 1 writes data to the reception buffer 2, and the data expansion block 3 reads only image data. A reception buffer ring structure control circuit 7 controls the write address and the read address in this process. The reception buffer ring structure control circuit 7 manages the leading address and the trailing address, and the write address and the read address.

The reception buffer ring structure control circuit 7 adds one address each time a write request signal (S701) is received from the interface controller 1, and outputs the result as the information about a write address to the reception buffer 2 (signal line S702). Then, when the trailing address of the reception buffer 2 is reached, the reception buffer ring structure control circuit 7 returns the write address to the leading address of the reception buffer 2.

When the write address reaches (matches) the read address, the reception buffer ring structure control circuit 7 notifies the interface controller 1 through the signal line S703 that the reception buffer 2 is full of data and no more data can be written.

At this time, it simultaneously notifies the CPU 9 using the interrupt signal of the signal line S904 that the reception buffer 2 cannot receive no more data to be written. The structure of the reception buffer 2 can be set by the CPU 9 writing the setting through the bus of the signal line S903.

A read address can be output to the reception buffer 2 by adding one address through the signal line S706 as a read address when the CPU 9 reads data in the reception buffer 2 directly through the data read register in the reception buffer ring structure control circuit 7, or when the data expansion block 3 requests it through the data read request signal line S705.

When the read address reaches the trailing address, the reception buffer ring structure control circuit 7 returns the read address to the leading address of the reception buffer 2. When the read address reaches (matches) the write address, no data is stored in the reception buffer, and the reception buffer ring structure control circuit 7 notifies the data expansion block through the signal line S704 that the subsequent data cannot be read. Simultaneously, the notification that there is no data to be read in the reception buffer 2 is transmitted to the CPU 9 through the interrupt signal of the signal line S904.

Described above is the process of writing and reading data to and from the reception buffer 2. Described below is the process of writing data read from the reception buffer 2 and expanded to a recording buffer, or reading data from the recording buffer.

<Write/Read Control of Recording Buffer>

The data expansion block 3 writes image data to the recording buffer 4, and the record data generation block 5 reads the written image data. In this process, the record buffer ring structure control circuit 8 controls the write address and the read address.

The record buffer ring structure control circuit 8 manages the leading address and the trailing address of the recording buffer, and the write address and the read address.

The record buffer ring structure control circuit 8 adds one address each time a write request signal (S801) is received from the data expansion block 3, and outputs it as the information about the write address to the recording buffer 4 (signal line S802). Then, the record buffer ring structure control circuit 8 returns the write address to the leading address of the recording buffer 4 when the trailing address of the recording buffer 4 is reached.

Furthermore, then the write address reaches (matches) the read address, the recording buffer 4 is full of image data, and the data expansion block 3 is notified of the information through the signal line S803 that the subsequent image data cannot be written.

When the data expansion block 3 reads a color change code from the reception buffer 2, the data expansion block 3 transmits the information through the signal line S804, and the record buffer ring structure control circuit 8 prepares the leading address for the subsequent color data to be output through the signal line S802. The structure of the recording buffer 4 can be set by the CPU 9 writing it to the internal register through the signal line S907.

When the record data generation block 5 requests the read address for each color through the data read request signal line s805, one address is added to the read address, and the resultant read address is output to the recording buffer 4 through the signal line S806.

When the read address reaches the trailing address, the record buffer ring structure control circuit 8 returns the read address to the leading address of the recording buffer 4.

The record data generation block 5 sets the data structure of the image data block currently being read in the register in the record data generation block 5 from the CPU 9 through the signal line S908. When the image data in the set structure of the image data block are all read, the termination signal S909 is transmitted as an interrupt signal to the CPU 9. At this time, if the subsequent image data block has already been expanded in the recording buffer 4, then the structure of the image data block is written to the register.

The record buffer ring structure control circuit 8 controls the write of data in an image data block unit, and does not activate the record data generation block for an unwritten image data block. Therefore, the read address of the recording buffer does not exceed the write address. A buffer structure information memory 11 is a work memory (work RAM) for control of the recording buffer, and temporarily stores the information about a recording buffer structure described later.

Described above is the outline of the flow of the record data in the record control unit, and describe below is the detailed functions of each control block.

<Interface Controller 1 (FIG. 4)>

Figure 4:
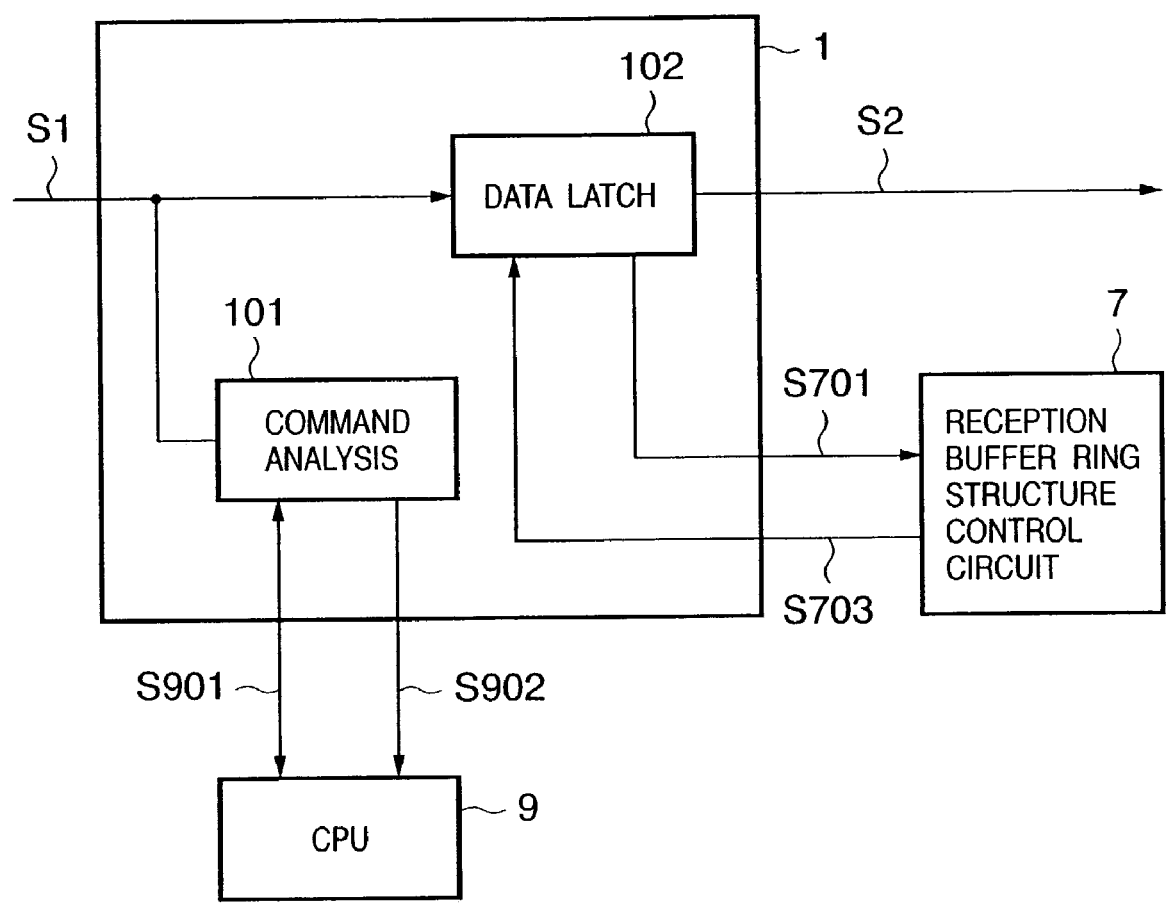
FIG. 4 is a block diagram inside the interface controller 1.

FIG. 4 is a block diagram of the inside of the interface controller 1 comprising a command analysis unit 101 and a data latch unit 102.

The command analysis unit 101 determines whether the data string transmitted from the host computer through the interface signal line S1 is command information for check of the status, etc. of the recording apparatus or the data relating to the image data. If the received data is command information for check of the status, etc. of the recording apparatus, then a status for identification of the status of the apparatus is automatically returned. If the received data is image data, then control of temporarily storing the data in the data latch unit 102 is performed. The command analysis unit 101 has a register for storing the status information about the recording apparatus, and the CPU 9 writes the information to the register through a bus (S901)

Upon receipt of data (command information, image data) through the interface signal line S1, the command analysis unit 101 outputs an interrupt signal (INT1) S902 to the CPU 9, thereby transmitting a notification about the completion of the reception of data. The CPU 9 receives the interrupt signal, and starts data processing.

The data latch unit 102 is a recording apparatus of some bytes, and has a FIFO structure. When the data latch unit 102 stores data, it outputs a write request signal S701 to the reception buffer ring structure control circuit 7, and the write request signal S701 is output until there is no the data stored in the data latch unit 102. However, when the reception buffer 2 is full and no data cannot be written to the buffer, or when it cannot receive any data due to any abnormal condition, the reception buffer ring structure control circuit 7 outputs a data transfer wait signal S703, and the data latch unit 102 receives the data transfer wait signal S703, and stops the data transfer.

When a data transfer stops, the FIFO of the data latch unit 102 immediately becomes full of data, and cannot receive data from the host computer. In this case, the status of the body of the apparatus is set in a busy state, and the command analysis unit 101 notifies the host computer of no reception of the data if data is received, and outputs a retransmission request to the host computer.

<Reception Buffer Ring Structure Control Circuit 7 (FIG. 5)>

FIG. 5 is a detailed block diagram of the reception buffer ring structure control circuit 7. The reception buffer ring structure control circuit 7 comprises a write address register (WP) 701 for outputting an address (write pointer) for a write of the data of the interface controller 1 to the reception buffer 2, and a read address register (RP) 702 for outputting a read address (read pointer) for output of data in the reception buffer 2 to the data expansion block 3. They are output as a write address signal line S702 and a read address signal line S706 respectively. It further comprises a leading address register (top_adr) 703 and a trailing address register (bottom_adr) 704 for respectively designating the leading address and the trailing address of the reception buffer 2. The initial values of the respective registers are set by the CPU 9.

For example, the leading address of the reception buffer 2 is set as a 1000 h address in the leading address register 703, the trailing address is set as a FFFFh address in the trailing address register 704, and 1000 h is set in the write address register 701 and the read address register 702 because there are initially no data in the reception buffer 2.

If there are no data in this initial state, an address control block 705 receives a write request signal S701 from the interface controller 1, but outputs to the data expansion block 3 a buffer empty signal line S704 informing that there are no data, and issues a request not to output a data read request signal S705. Upon receipt of the write request signal S701 from the interface controller 1, and upon completion of the write the first data to the reception buffer 2, the address control block 705 adds 1 to the value of the write address register 701. The above-mentioned control is repeated each time a write request is received. When the next write address exceeds the value set in the trailing address register 704, the value set in the leading address register 703 as a next address is set as the value of the write address register 701.

When the value of the write address register 701 matches the value of the read address register 702, the reception buffer 2 is full of data not read yet, and the subsequent data cannot be written. Therefore, the address control block 705 outputs a buffer full signal line S703 to the interface controller 1 to suppress the output of the write request signal S701.

The status of the reception buffer 2 storing any piece of data is represented by the value of the write address register 701 different from the value of the read address register 702. In this case, if the address control block 705 stops outputting the buffer empty signal line S704, the data expansion block 3 outputs the data read request signal S705, and the reception buffer 2 completes reading data from the reception buffer 2, then the address control block 705 adds 1 to the value of the read address register 702.

The above-mentioned control is performed each time a read request is issued. When a next read address exceeds the value set in the trailing address register 704, the value set in the leading address register 703 as the next address is set as the value of the read address register 701.

When the value of the read address register 702 matches the value of the write address register 701, there is no data not read yet in the reception buffer 2, and the next data cannot be read. Therefore, the address control block 705 outputs the buffer empty signal line S704 to the data expansion block 3, and suppresses the output of the data read request signal S705.

Furthermore, when the reception buffer 2 enters a buffer empty state or a buffer full state, or when the states are released, the address control block 705 outputs a reception buffer interrupt signal line S904 (INT2) to notify the CPU 9 of each time.

FIG. 6 shows the operation timing of the reception buffer ring structure control circuit 7, and shows the changes of each signal line of the write request signal S701, the write address signal line S702, the buffer full signal line S703, the buffer empty signal line S704, the data read request signal S705, and the read address signal line S706. As described above, each time the write request signal S701 is input, one is added to the value of the write address signal line S702. Each time the data read request signal S705 is input, one is added to the value of the read address signal line S706. When there is no data in the reception buffer, the buffer empty signal line S704 is output (timings A and B shown in FIG. 6). When the reception buffer becomes full of data, the buffer full signal S703 is output (timing C shown in FIG. 6).

<Explanation of the Record Buffer Ring Structure Control Circuit>

The record buffer ring structure control circuit is described below by referring to FIGS. 7A and 10. In the process performed by the record buffer ring structure control circuit 8, FIG. 7A mainly shows the control of a write address, and FIG. 10 mainly shows the control of a read address of the record buffer ring structure control circuit 8.

The record buffer ring structure control circuit 8 is configured by a read address control unit 8A and a write address control unit 8B. Relating to the buffer area of the recording buffer 4, the leading address of the recording buffer is indicated by top_adr, and the trailing address is indicated by bottom_adr. The leading address is stored in a register 803 in the write address control unit 8B, and the trailing address is stored in a register 804 in the write address control unit 8B.

The "RP" in the recording buffer 4 indicates a read pointer, and the "WP" indicates a write pointer. The hatching portion between the RP and the WP of the recording buffer indicates that record data is stored. The white portion of the recording buffer 4 indicates that no record data is stored.

A register 802 in the read address control unit 8A is a register indicating the read address (RP: read pointer) of data. Registers 805 to 812 store the information about each of the first color to the eighth color. The register 805 stores the height information about the buffer of the first color data and the information about the presence/absence of the first color data. Similarly, the registers 806 to 812 store the information about the second color to the eighth color.

A register 813 sets the width information about a block. The width information is commonly used for the first color to the eighth color in a block unit.

The height information and the width information about a block are included in the setting data described above by referring to FIG. 2A.

A register 815 stores the address of the next block data. The address can be determined by any of the values of the registers 805 to 812 storing the information about each color, and the value of the register 813 storing the width information about block data. The write address control unit 8B determines the write starting address of the second block data to be next written according to the setting information about the first block data to be written, and the data is stored in the register.

The write address control unit 8B can update the write address information for the next second block data into the determined write starting address before completion of the write of the image data corresponding to the first block data. Furthermore, the write address register 816 stores a write address of data.

The address control register 814 manages the writing process and the reading process such that a write address cannot exceed a read address (both addresses cannot overlap) in the address control register.

<Storage of Data in Recording Buffer (FIGS. 8A to 8D)>

Figure 8A:
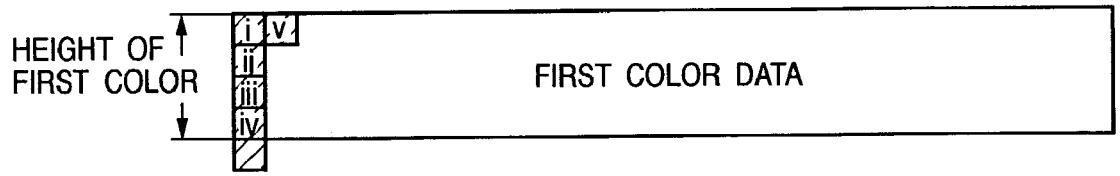
FIGS. 8A to 8D and 8E to 8J are explanatory views as to how image data is stored in the recording buffer 4.

FIGS. 8A to 8D show how image data is stored in the recording buffer 4. In FIG. 8A, words are vertically arranged in four word units as the first color data. In this example, one word corresponds to 16 pixels (nozzles). The address at which a register stores information is incremented one by one. A write pointer (WP) is sequentially counted 1→2→3→4→5→ . . .

For example, in the settings of the register shown in FIG. 8A, the value of the height information (number of word) of the buffer is "4", and the value of the presence/absence information about data is "1 (presence)". The value of the register 813 (width information about a block) is "28".

Figure 7B:
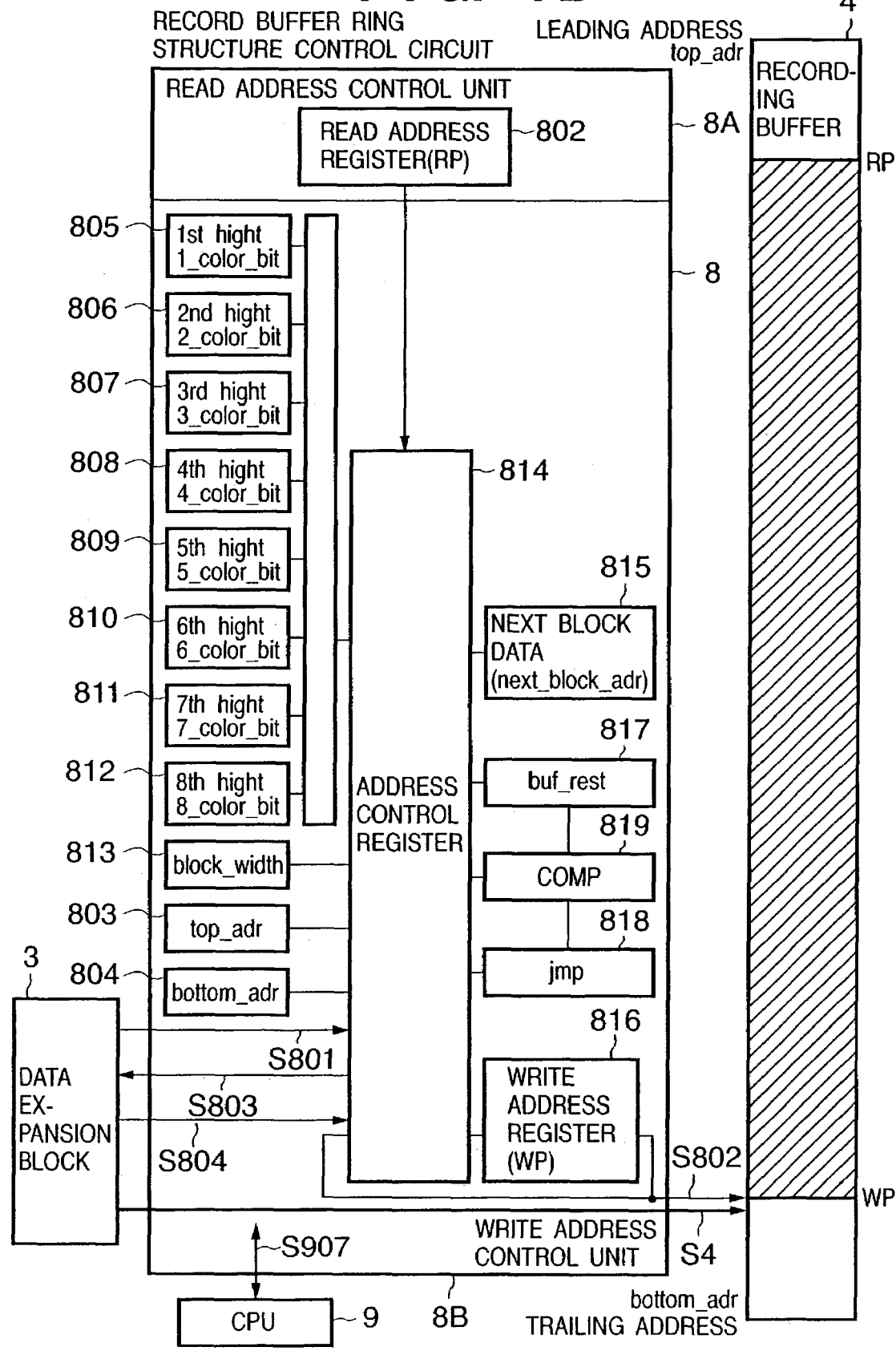
Figure 8B:
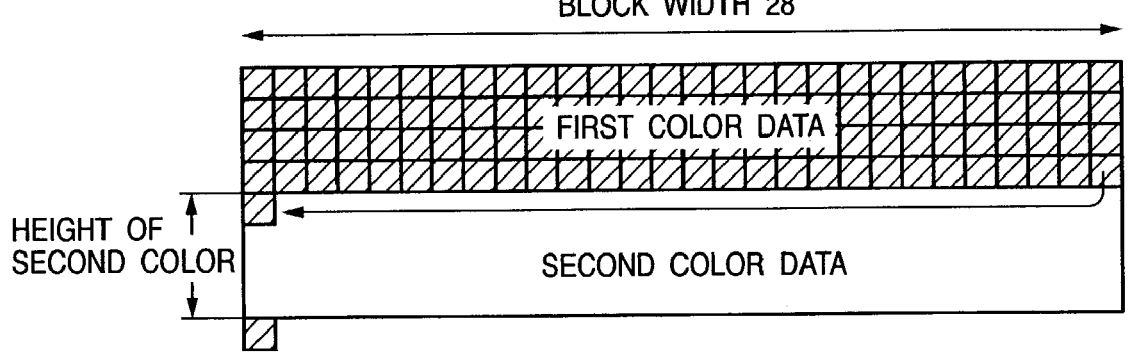
Figure 8C:
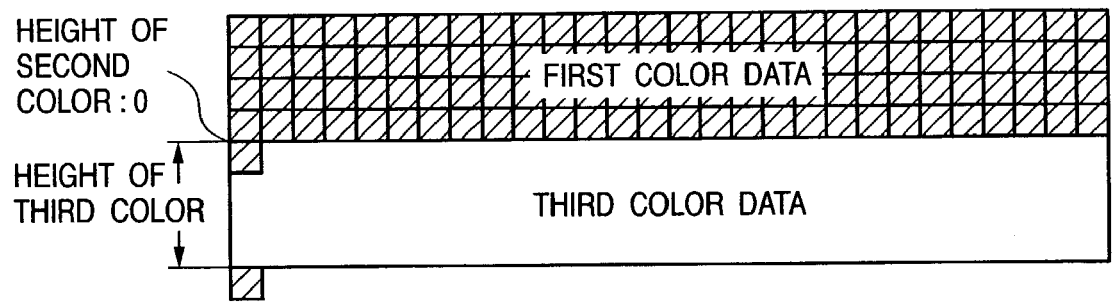

FIG. 8B shows the write of data to the recording buffer 4 when there is the second color data. After all data is stored in the storage area of the first color, the write pointer (WP) is transferred to the leading address of the second color, and the second color data is stored. In FIG. 8C, when there is no second color data, the third color data is stored after the storage area of the first color data. In this case, the presence/absence information about the second color data of the register 806 shown in FIG. 7A is "0 (none)". Otherwise, if the height information of the buffer is "0", it also indicates there is no data. Therefore, the information is available. Furthermore, a logical sum (AND process) of the presence/absence information about data and the height information about the buffer is obtained, and the result is checked.

Figure 8D:
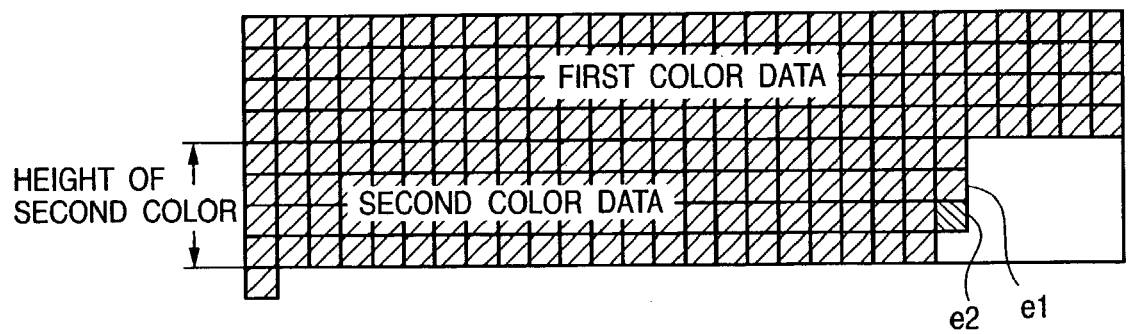

In FIG. 8D, e1 (WP: write pointer) indicating the write position of the second color data indicates that a write is stopped before e2 (RP: read pointer) indicating the read position. That is, when a read is not completed, a data write is controlled to be stopped to prevent an overwrite. The same control is performed on the areas of the third color to the eighth color.

FIG. 10 will be described below. The left portion of FIG. 10 shows the read address control unit 8A of the record buffer ring structure control circuit 8, and the right portion shows the recording buffer 4.

The buffer area of the recording buffer 4 is represented by top_adr which is the leading address of the recording buffer and bottom_adr which is the trailing address. The leading address is stored in the register 803, and the trailing address is stored in the register 804. The "RP" in the recording buffer is a read pointer as shown in FIG. 7A, and the "WP" is a write pointer. The hatching portion between the RP and the WP in the recording buffer 4 indicates that record data is stored. The white portion of the recording buffer indicates that no record data is stored.

The register 802 in the read address control unit 8A indicates a data read address (RP: read pointer). A first register group 900 is enclosed by a frame of broken lines, and a second register group 901 is enclosed by a frame of solid lines.

When the image data from the first block to the eighth block is recorded, for example, the first register group stores the information about the first block when the scanning is started. The second register group stores the information about the second block. When the recording of the first block is completed, the information about the second register group 901 is copied to the first register group 900, and the first register group 900 stores the information about the second block. Then, the second register group 901 stores the information about the third block. Likewise, the process sequentially continues until the data of the trailing eighth block is stored. When the next scanning is started, the first register group stores the information about the first block, and the second register group stores the information about the second block.

When recording the n-th block of the first register group is completed, and if the information about the (n+1) th block is not stored in the second register group, then the print data of the (n+1) th block has not been prepared, and the information about the second register group is not copied to the first register group, and a data read from the recording buffer is stopped.

A register (1st_hight 1 color bit) 819 in the first register group sets the presence/absence information about the height information and the color data of the first color. Each register 822, 824, 826, 828, 830, 832, or 834 sets the presence/absence information about the height information and the color data of the second color to the eighth color.

A register 820 stores the width information about each block data. The width information is commonly used in a block unit from the first color to the eighth color.

A register (1st_color_adr) 818 stores the read address of the first color. When data is read from the recording buffer 819 storing the data of the first color, the address is updated. For example, data of one column of 1→2→3→4 is read in the first color data as shown in FIG. 8A. The registers 821, 823, 825, 827, 829, 831, and 833 stores the read addresses of the second color to the eighth color, and the color data of 1 column is read for the second color to the eighth color as in the case of the color data of the first color.

Since the data stored in the recording buffer 4 includes the data of a plurality of colors, the addresses at which the color data are stored are not consecutive when, for example, the color data of the first color, the second color, . . . exist in a mixed manner. Therefore, if there is one register of a read address for each piece of color data, it is necessary to compute the address when one address of the second color of the recording buffer is read after the address of the first color data of the recording buffer 4. However, by preparing a register for storing a read address for each color in the recording buffer 4, the address computation to be performed when data is read in a column unit can be omitted.

Reference numeral 817 denotes an address control register. When the record data generation block 5 requests a read address for each color through the data read request signal line S805, the address control register 817 adds one address and outputs the resultant read address to the recording buffer 4 through the signal line S806.

A register 835 stores the address of the next block. If the currently read block is the first block, then the register stores the leading address of the second block. The value of the register is copied to the register 802 when the currently read block data is completely read. Thus, the next block diagram can be smoothly read.

A register 836 is a table storing the information for specification of the reading order of the first color to the eighth color. In accordance with the value set in the table, the reading order of data from the recording buffer can be freely set. For example, they can be read in the order of first color→second color→ . . . →eighth color. The values can be changes into first color→second color →fifth color→sixth color→seventh color→eighth color by skipping the third and fourth colors. Thus, the image data in which some colors are omitted can be correctly omitted in a reading operation.

The second register group 901 is a group of buffers storing information relating to the subsequent block data. When each register of the first register group is read, the value set in each register of the second register group is set in the corresponding register in the first register group. For example, the value set in a register 838 is set in the register 819. Registers 839 to 845 are registers in which similar information about the color data of the second color to the eighth color is set.

The register 838 (819) stores the height information about the buffer of the first color data, and the information about the presence/absence of the first color data.

A register 846 (820) is a register in which the width information about a block is set. The width information is commonly used in a block unit from the first color to the eighth color.

When the size of a block is the same as the size of the previously set block, the value is set to "1" in a register 878 to set the same value in the first register group. In this case, the settings of the registers 838 to 846 can be omitted. When the value of the register 878 is "0", the respective values are set in the registers 838 to 846. The register (same_type) 878 can easily set the register if the block sizes are the same.

Figure 11:
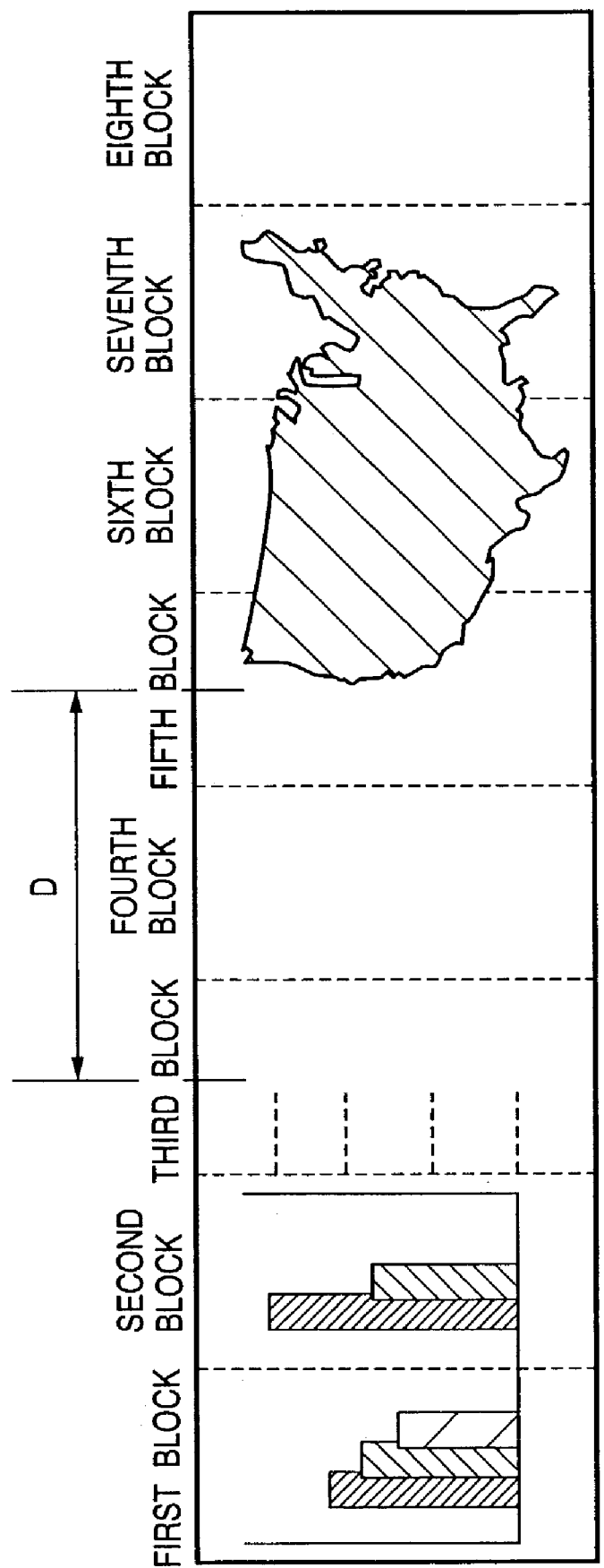
FIG. 11 is an explanatory view of the relationship between the record area for recording data in one scanning operation and the image data in the area.

FIG. 11 shows the outline of the relationship between the record area in which data is recorded in one scanning operation and the image data recorded in the area. In FIG. 11, there is no image data in the area D indicated by arrows and the area corresponding to the eighth block. The area D corresponds to the right portion of the third block, the total portion the fourth block, and the left portion of the fifth block.

FIG. 9A shows the image data written to the recording buffer shown FIG. 11. In the area D shown in FIG. 11, there is no image data on the area corresponding to in the fourth block. Therefore, the fourth block is not reserved in the recording buffer.

Additionally, since the data stored in the second block contains no third color data and the fourth color data, they are omitted, and the fifth color data to the eighth color data are stored. In the third block, only the first color data and the second color data are stored, and the color data of and after the third color data are not stored. The hatching portions in the second block and the third block do not include data, and is not assigned any buffer. Therefore, the next address after the trailing address of the eighth color data in the second block is the leading address of the first color data in the third block. Thus, since existing image data only can be stored in the recording buffer, the recording buffer can be efficiently used.

Therefore, for example, although the recording buffer cannot reserve the area of storing all data for one scanning operation when the area of the recording buffer is equally assigned to an area including no image data, the data of one scanning operation can be stored by controlling the storage of data according to the presence/absence information about color data stored in the register according to the present embodiment.

<Explanation of Recording Operation>

Figure 12:
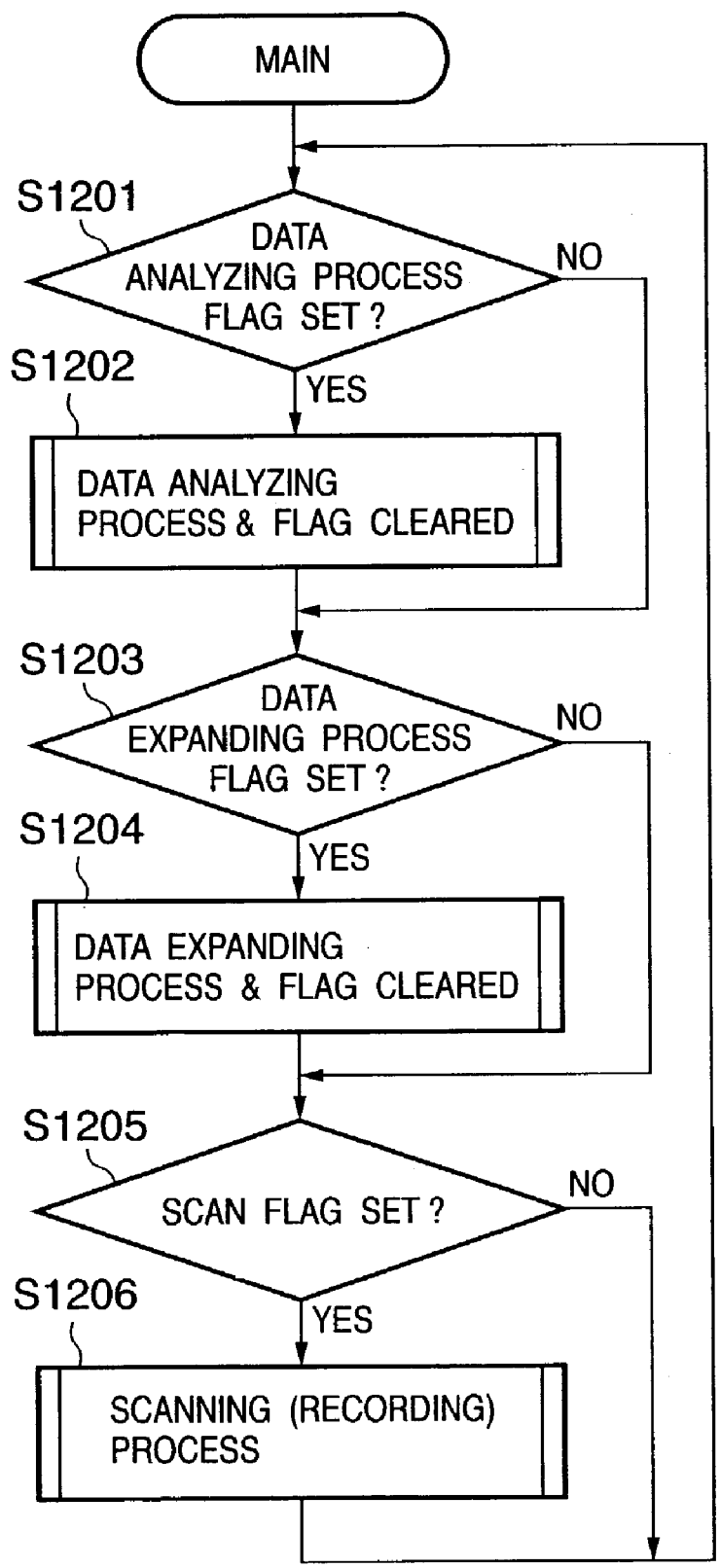
FIG. 12 is an explanatory flowchart of the image data processing and the process of a recording operation.

FIG. 12 is an explanatory flowchart of the processing of image data and the process of a recording operation. In step S1201, a data analysis flag is checked. If a data analysis flag is set (YES in S1201), then control is passed to step S1202, a data analyzing process is performed, and the data analysis is cleared, if the data amount is cleared (NO in S1201), then the step S1202 is skipped, and control is passed to step S1203.

In step S1203, a data storing process flag is checked. If the data storing process flag is set (YES in S1203), then control is passed to step S1204, the data storing process is performed, and the data storing process flag is cleared. If the flag is not set (NO in S1203), then the step S1204 is skipped.

In step S1205, a scan flag is checked. If the scan flag is set (YES in S1205), then control is passed to step S1206, and a scanning (recording) process is performed (S1206). If the scanning process is completed, then control is returned to step S1201.

When in the determination in step S1205, the scan flag is not set (NO in S1205), the process in step S1206 is skipped, and control is returned to step S1201.

Figure 13:
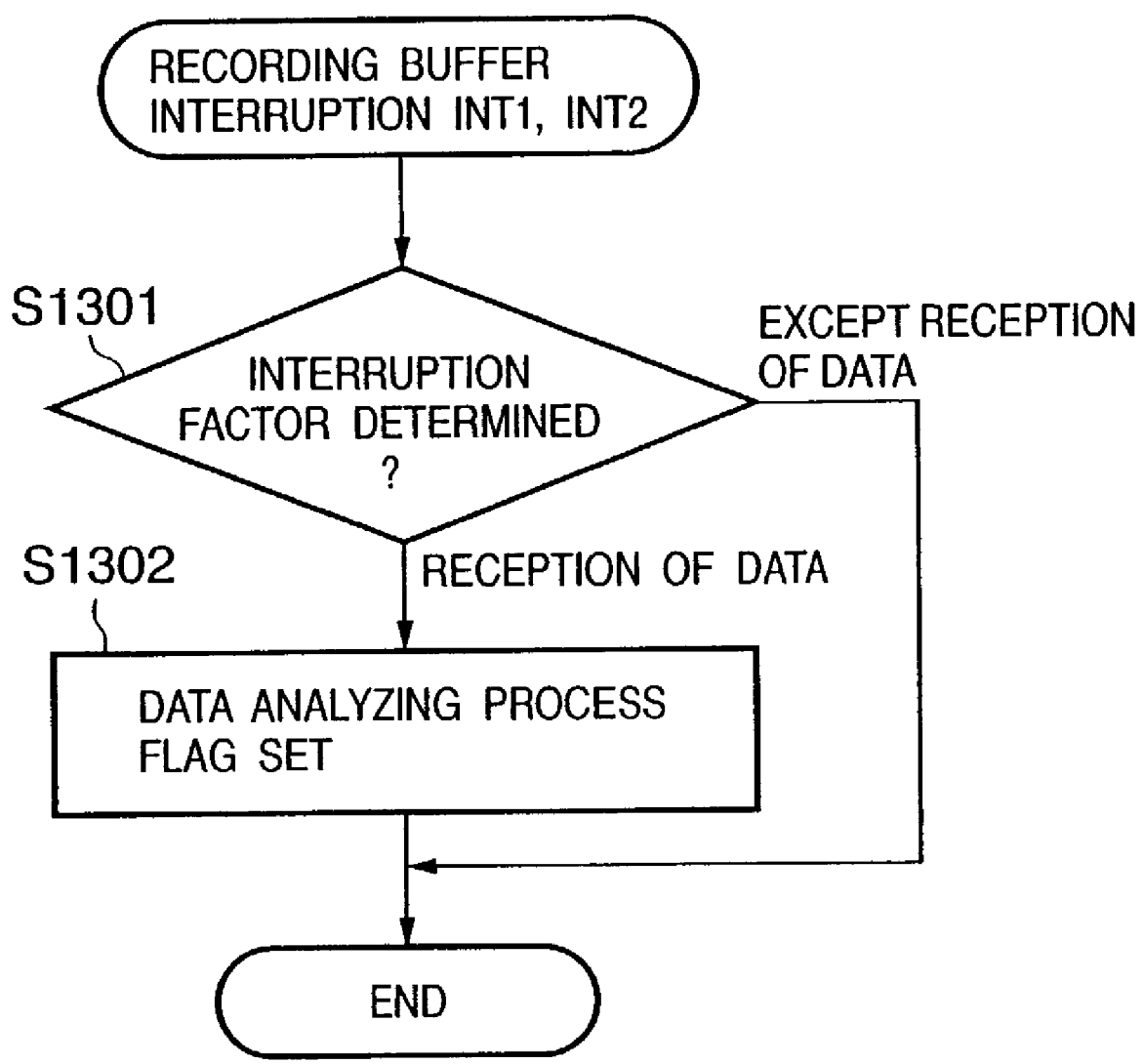
FIG. 13 is an explanatory flowchart of the reception buffer interruption (INT1, INT2) process.

FIG. 13 is an explanatory flowchart of the reception buffer interruption (INT1, INT2) process. The interruption factor is determined in step S1301. If the interruption factor is data reception, control is passed to step S1302, and the data analysis flag is set. At this time, the presence/absence of settings is determined for the set data analysis flag in step S1201.

Figure 14:
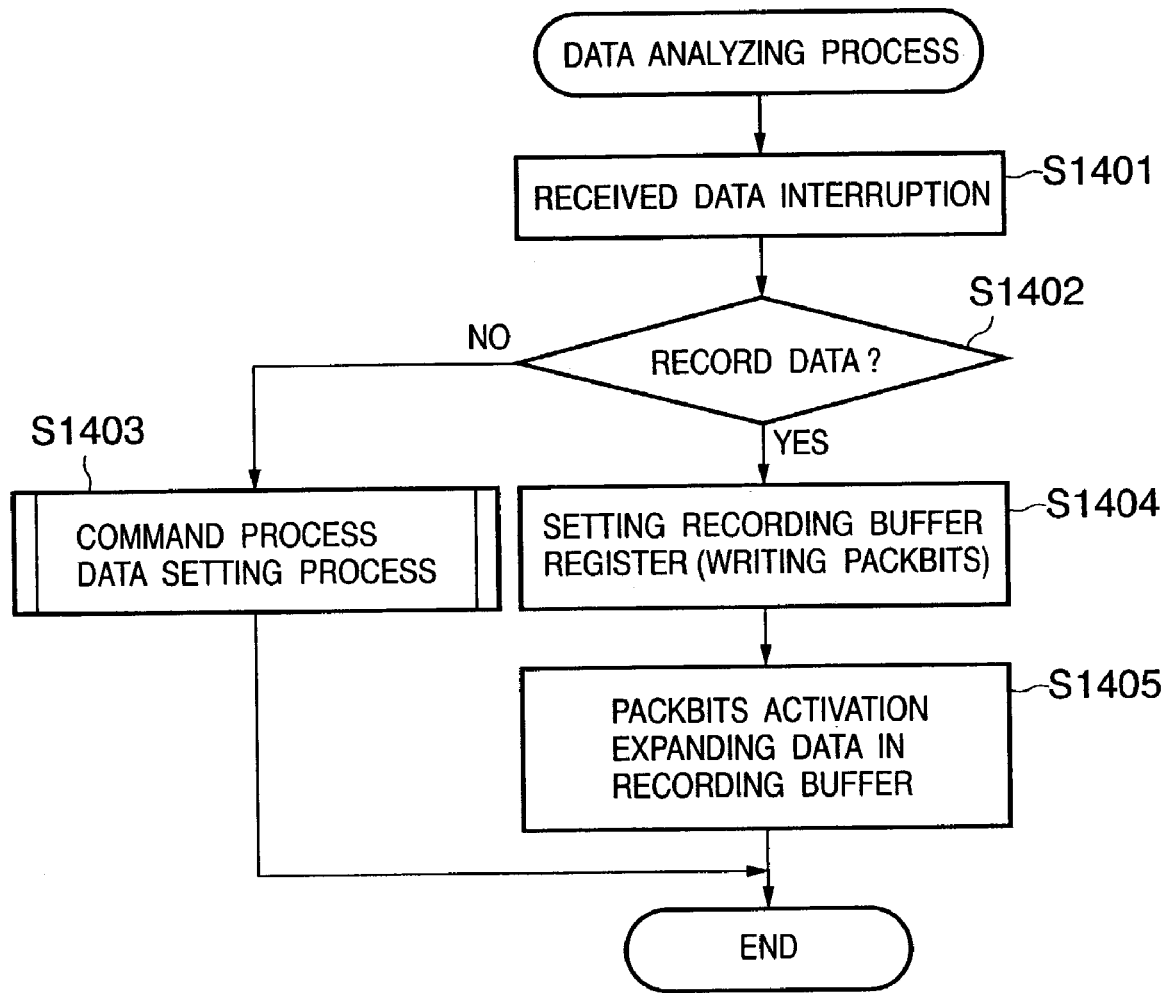
FIG. 14 is an explanatory flowchart of the control in the data analyzing process.

FIG. 14 is an explanatory flowchart of the control in the data analyzing process. The data analyzing process is performed in step S1202 shown in FIG. 12. First, received data is fetched in step S1401.

Then, it is checked whether or not the data received in step S1402 is record data. If the data is record data (YES in S1402), then control is passed to step S 1404, and presence/absence information is set in the recording buffer (S1404). In step S1405, a PakBits activating process is performed, and the data read to the recording buffer is stored.

If the received data is not record data in the determination in step S1402, then control is passed to step S1403, and the command process and the data setting process are performed. In step S1403, the information about the width of the buffer and the height of the buffer is set in the transfer buffer for the color having no data in the image data. The transfer buffer is the buffer structure information memory 11 shown in FIG. 1.

Figure 15:
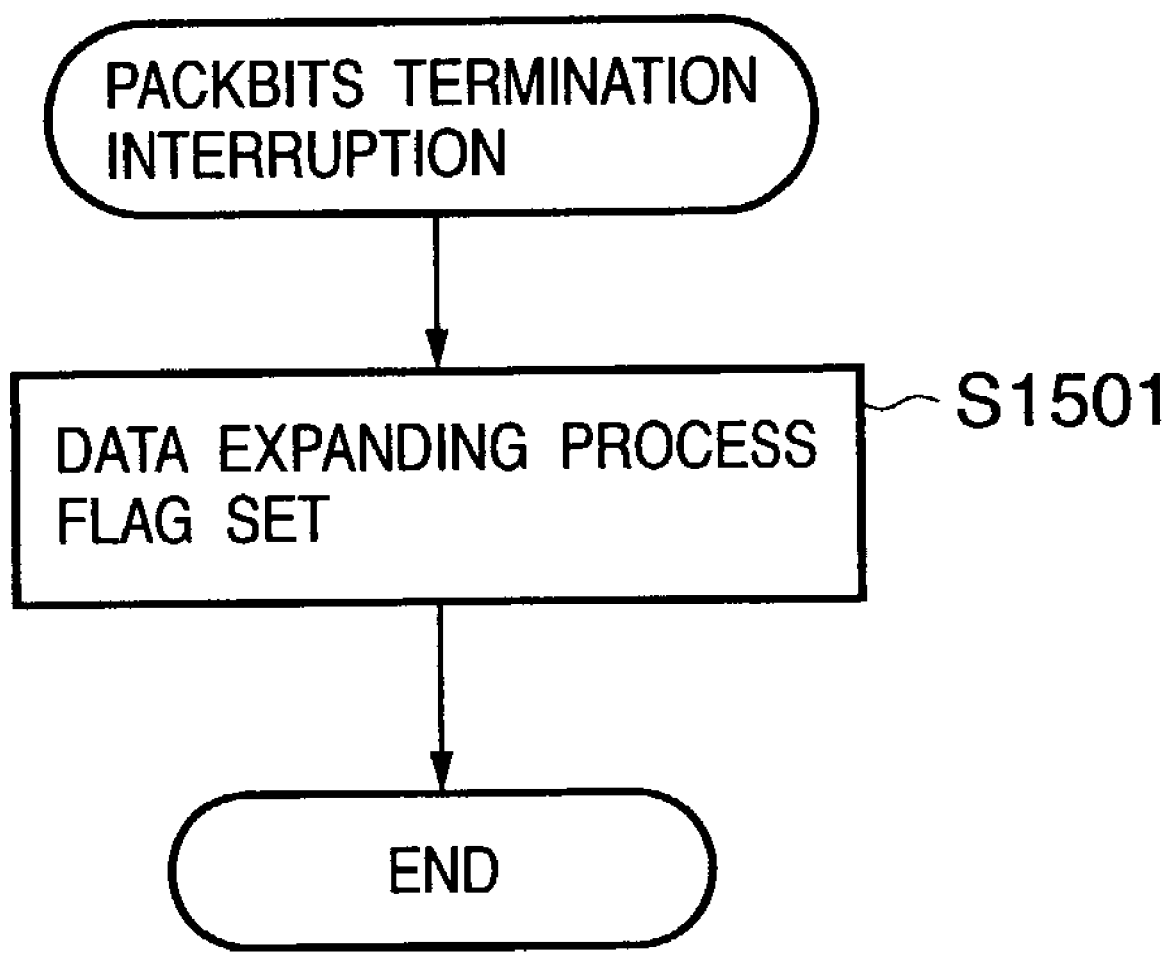
FIG. 15 is an explanatory flowchart of the process of the PackBits termination interruption (INT3)

FIG. 15 is an explanatory flowchart of the process of the PackBits termination interruption (INT3). When the PackBits process is completed, the data storing process flag is set in step S1501, and the process terminates. It is determined in step S1203 (FIG. 12) whether of not the data storing process flag is set in the flowchart shown in FIG. 12.

Figure 16:
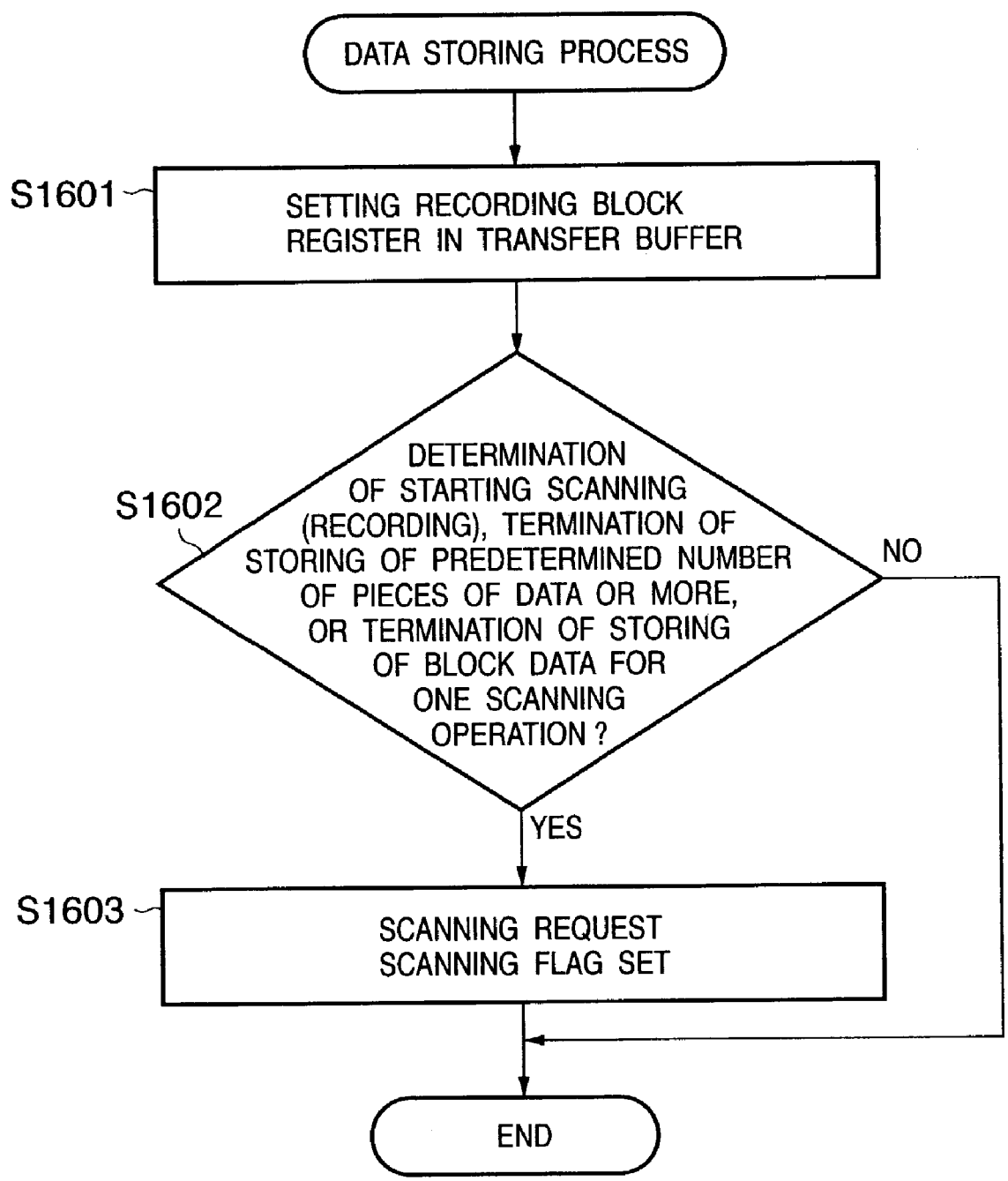
FIG. 16 is an explanatory flowchart of the data storing process.

FIG. 16 is an explanatory flowchart of the data storing process. In step S1601, the value set in the record block register is set in the transfer buffer. The transfer buffer is the buffer structure information memory 11 shown in FIG. 1, and the record block register is, for example, the register (900, 901) set in a block unit shown in FIG. 10.

A scanning start determination is made in step S1602. It is determined whether or not data in a predetermined number of blocks or more has been completely stored (for example, data of one block or one scanning operation has been completely stored). If the data has been completely stored (YES in S1602), then control is passed to step S1603, and a scan flag is set for a scanning request, and the process terminates (S1603).

The process in the flowchart shown in FIG. 16 corresponds to the process in step S1204 shown in FIG. 12.

Figure 17:
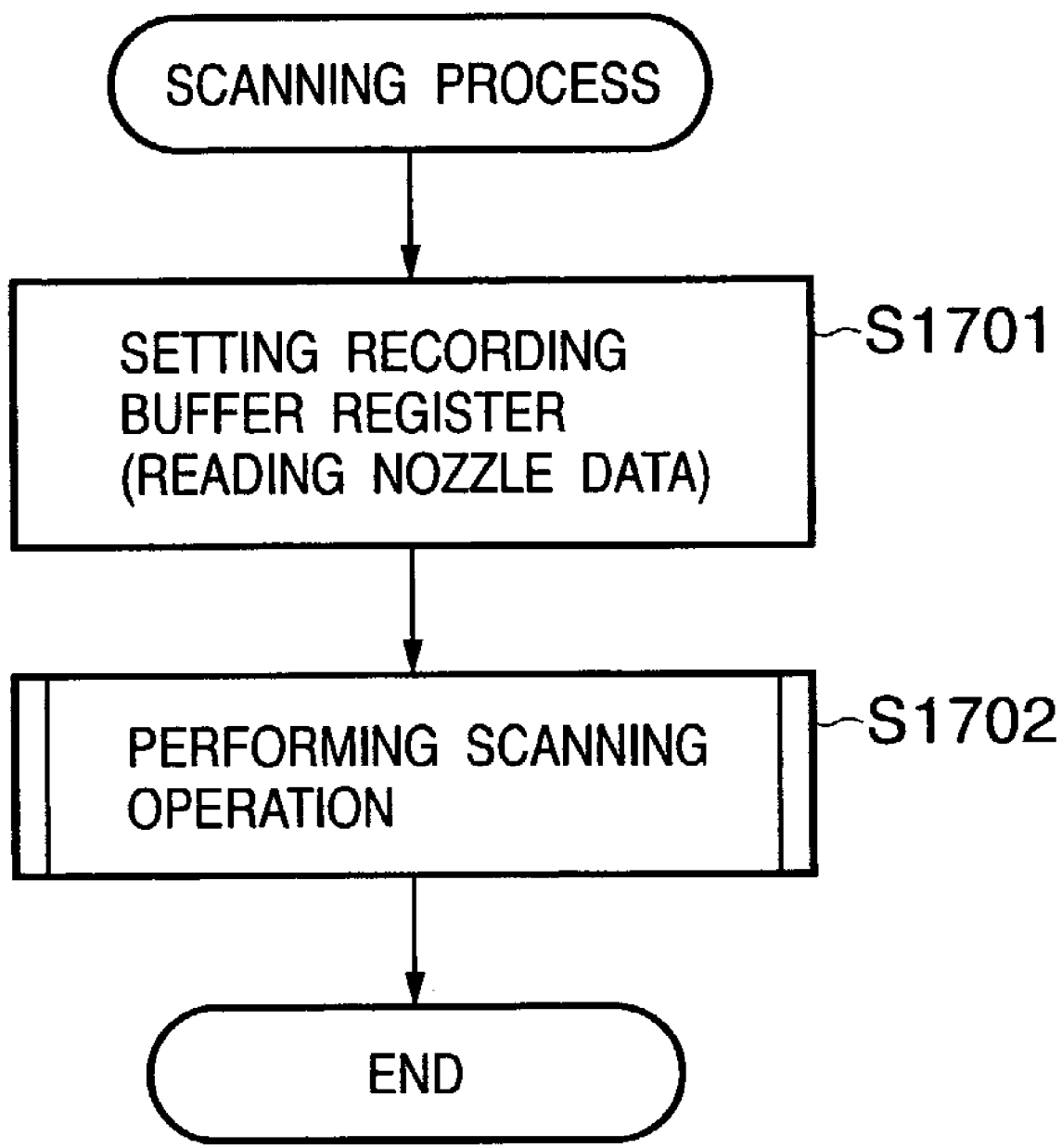
FIG. 17 is an explanatory flowchart of the scanning process.

FIG. 17 is an explanatory flowchart of the scanning process. In step S1701, the data stored in the transfer buffer explained by referring to step S1601 shown in FIG. 16 is set in the record block register (900, 901). In step S1702, the image data set in the record block register is scanned (recorded).

Figure 18:
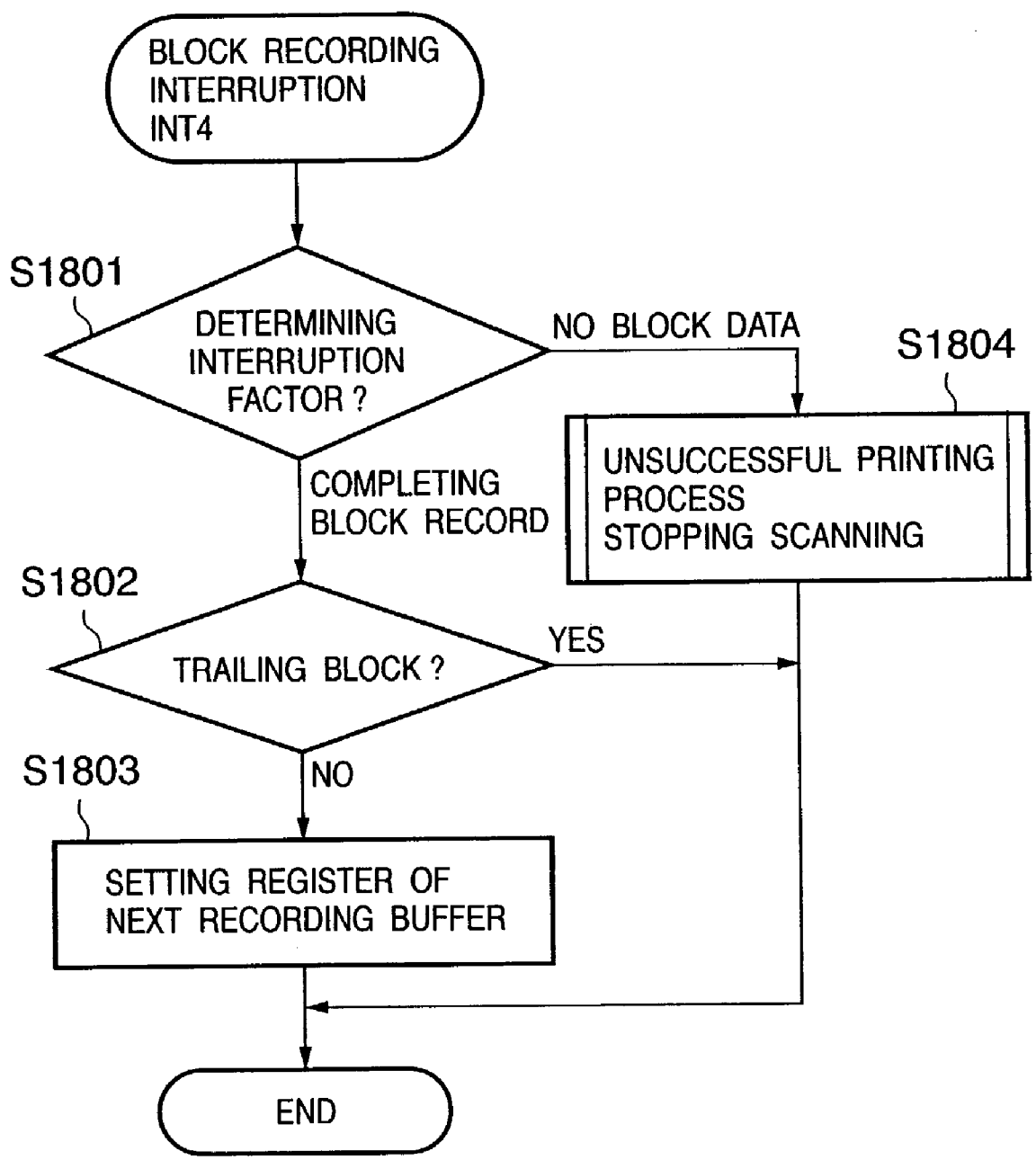
FIG. 18 is an explanatory flowchart of the interruption (INT4) process performed when block data is recorded.

FIG. 18 is an explanatory flowchart of the interruption (INT4) process performed when block data is recorded. The interruption is exercised if processes are terminated in a block unit in a recording operation. For example, if data to be recorded is stored in eight blocks, then eight interruptions can be performed. In recording block data, an occurring interruption factor is determined (S1801). If the interruption factor is termination of block data, then control is passed to step S1802.

On the other hand, if the interruption factor is no block data to be recorded, that is, if there is no record data (for example, after checking the value of the write address pointer (RP) and the value of the read address pointer (WP), and no data is stored in the block), then control is passed to step S1804, an unsuccessful printing process is performed, and the scanning operation is stopped (S1804). In this case, data has been half recorded up to a certain block, unrecorded data is stored, data is scanned again, and data is recorded for an unprinted area.

In step S1802, it is determined whether or not the completely recorded block is the trailing block. If it is the trailing block (YES in S1802), then the process terminates. If it is not the trailing block (NO in S1802), then control is passed to step S1803, and the block data of the next image data is set in the register.

As described above, according to the recording apparatus and the method for controlling a recording apparatus of the present invention, control of a write and a read to a buffer can be performed in a block unit on the data including a plurality of colors. The control can be performed by adjusting the input/output of block data by controlling the write and read addresses in the buffer for the data of each block corresponding to a plurality of areas obtained by dividing an original area for one scanning.

Otherwise, the address management performed when image data of each color is written to a recording buffer can be efficiently performed by individually managing the height (number of rasters) information for the data of each color data and the information about the presence/absence of the data of each color.

Furthermore, since it is determined whether or not data is present for the data of each color, it is not necessary to reserve a recording buffer area for an area including no data, thereby efficiently using a buffer area.

Additionally, since it is not necessary to transfer data including no color information for each color data, data can be efficiently transferred.

Second Embodiment

FIG. 9B shows the case in which memory can be more effectively used than the case shown in FIG. 9A in the first embodiment. In FIG. 9A, the width information in the scanning direction of each of the blocks obtained by dividing a record area into a plurality of area is equal in every block. However, when there is no image data to be recorded in a block, the minimum width information is to be stored. For example, in the third and fifth blocks shown in FIG. 11, the third block contains image data on the left side only, and the fifth block contains image data in the right side only. Therefore, the lengths of the third block and the fifth block can be reduced into half of the other blocks depending on the number of image data.

Thus, the recording buffer can be efficiently used although there is a small memory capacity. For example, although there is reserved no area in the recording buffer enough to store all data of one scanning operation, the data for one scanning operation can be stored.

In this case, if null image data continues over a plurality of blocks, the host device can generate command information and image data such that the lengths of blocks can be different from each other.

The buffer area can be effectively utilized by storing data under control of width information about data in a block unit depending on the amount of image data. In this case, the information about the length of the block data generated by the host device is received by the recording apparatus as the information included in the setting data, and the width information is set in the register not shown in the attached drawings for variable settings.

Described above are the embodiments of the present invention, but the gist of the present invention is not limited to 64 nozzles per nozzle array of the recording head or four colors used in the recording process.

Furthermore, according to the present embodiment, the record area is divided into eight portions in the horizontal scanning direction, but the number of divided blocks is not limited to this value. Additionally, the register of the record buffer ring structure control circuit can not only store the height information about the recording buffer of each color in one register and the presence/absence information about color data as shown in FIGS. 7A and 10, but also use a register for storing the height information only and a register for storing presence/absence information about color data only.

Furthermore, to set the width information about the block data in a block unit, a register can be provided for the data of each color.

Third Embodiment

<Write Control to Recording Buffer 4 (FIG. 7B)>

In the first embodiment, the process of the record buffer ring structure control circuit is described by referring to FIG. 7A. According to the third embodiment, the contents of the write address control are described by referring to FIG. 7B, and the storage of data in the recording buffer is described by referring to FIGS. 8E to 8J. The overlapping contents between the first and third embodiments are omitted here.

FIG. 7B mainly shows an explanatory view of the write address control according to the third embodiment. In FIG. 7B, a register 817 indicates the remainder in the recording buffer 4, that is, the amount of a white portion, obtained by computing by the following equation.

[condition 1: when write address (WP)≧read address (RP)]

$$\text{buffer remainder} = \text{amount of recording buffer (bottom\_adr-top\_adr)} - \text{amount of record data } (WP\text{-}RP) \quad (1)$$

where since addresses are cyclically used in the recording buffer, the remainder of the buffer can be determined by equation (2) when the following condition holds.

[condition 2: when write address (WP)<read address (RP)]

$$\text{buffer remainder} = \text{read address } (RP) - \text{write address } (WP) \quad (2)$$

where 818 indicates the address storing the difference between the write address (WP) of 816 and the next color block write leading address (next_block_adr) stored in the register 815, and indicates the update amount of the write address. The update amount of the write address can be obtained by the equations (3) and (4).

[condition 3: when next color block write leading address (next_block_adr)≧write address (WP)]

update amount (jmp) of write address=next color block write leading address (next_block_adr)−write address (WP) (3)

where the update amount of the address is computed by the following equation (4) when the following condition holds because the addresses are cyclically used in the recording buffer.

[condition 4: when next color block write leading address (next_block_adr)<write address (WP)]

update amount (jmp) of the write address=amount of recording buffer (bottom_adr−top_adr)+next color block write leading address (next_block_adr)−write address (WP) (4)

A comparator (COMP) 819 compares the remainder of the recording buffer 4 of 817 and the update amount of the write address of 818. When the equation (5) holds, 0 is output to the signal line S803. When the equation (6) holds, 1 is output to the signal line S803 remainder (buf_rest) of recording buffer 4≧update amount (jmp) of write address (5)

remainder (buf_rest) of recording buffer 4<update amount (jmp) of write address (6)

Upon receipt of the color change signal S804, the address control register 814 writes the value of the next color block write leading address (next_block_adr) to the write address (WP) of 815 when the output signal of the comparator (COMP) 819 is 0, and prohibits a rewrite of the write address (WP) of 816 when the output signal of the comparator 819 is 1.

<Storage of Data in the Recording Buffer (FIGS. 8E to 8J)>

Figure 8E:
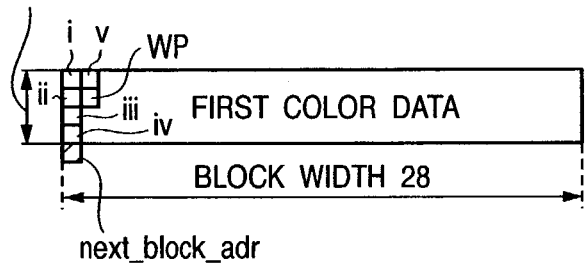

FIGS. 8E to 8J show explanatory views as to how to image data is stored in the recording buffer 4. In FIG. 8E, data is vertically stored as the first color data in 4 word units. In this example, one word corresponds to 16 pixels (nozzles). Assuming that the address at which information is stored in the register is incremented one by one, the write pointer (WP) is counted as 1→2→4→5→. . .

For example, the setting of the register shown in FIG. 8E is "4" as the value of the height information (number of word ) of the buffer, and "1" (presence) as the value of the presence/absence information about data. The value of the register 813 (width information about a block) is "28".

Figure 8F:
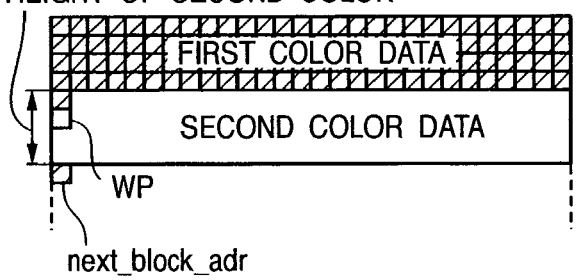

FIG. 8F shows a write of data to the recording buffer 4 when there is the second color data. After all data is stored in the storage area of the first color, the write pointer (WP) is moved to the leading address of the second color as indicated by the arrow, and the data of the second color is stored.

Figure 8G:
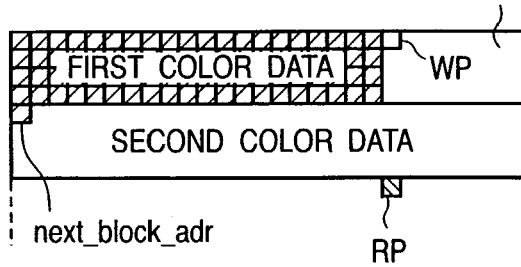
Figure 8H:
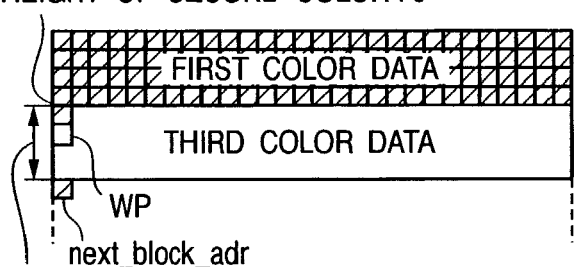

As shown in FIG. 8H, the third color data is stored after the storage area of the first color data if the second color data is not detected. In this case, the presence/absence information about the second color data of the register 806 shown in FIG. 7B is 0 indicating no data. Otherwise, if the height information of the buffer is 0, it indicates no data. Therefore, the information is available. Additionally, a logical sum (AND process) of the presence/absence information about data and the height information about the buffer is performed, and the result is checked.

In FIG. 8G, there is a blank portion in a part of the first color data, and blank data is not transmitted for the white portion, but it is determined that the first color data has been completely stored if the color change signal S804 is detected. As described above by referring to FIG. 7B, since the remainder of the recording buffer is larger than the update amount of the write address, and the output of the comparator 819 is 0, the value of the next color block write leading address (next_block_adr) 815 is written to the write address (WP) of 816, and is moved to the leading address of the second color, and the storage of the second color data is started.

Figure 8I:
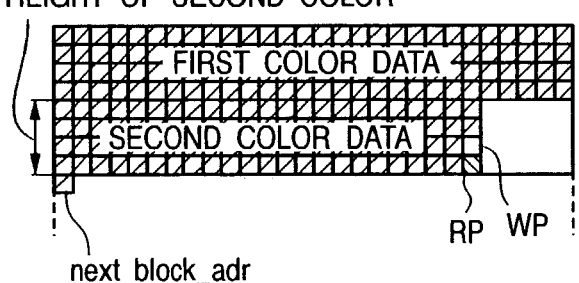

In FIG. 8I, e1(WP: write pointer) indicating a write position specifies stopping a write before 2e (RP: read pointer) indicating the read position for the data of the second color. This means that a write of data is controlled to be prohibited in the position where a read is not completed so that an overwrite can be prevented. The above-mentioned control holds true with the areas of the third color to the eighth color.

Figure 8J:
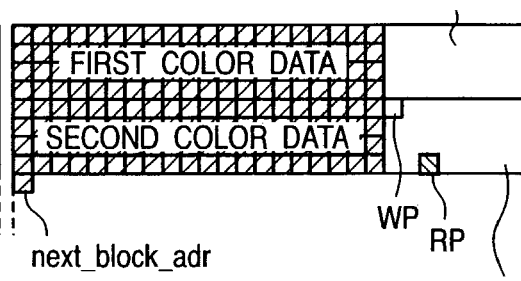

FIG. 8J shows the case in which there is a blank portion in a part of the second color data. No blank data is transmitted for the blank portion. If the color change signal S804 is detected, it is determined that the storage of the second color data has been completed. The difference from FIG. 8G is that, as described above by referring to FIG. 7B, the remainder of the recording buffer is smaller than the update amount of the write address, and the output of the comparator 819 is 1. Therefore, the value of the next color block write leading address (next13 block13 adr) of 815 cannot be written to the write address (WP) of 816. If the read pointer (RP) exceeds the value of the next color block write leading address (next_block_adr), then control is passed to the leading address of the third color, and the storage of the third color data is started.

Since the explanation of and after FIG. 9A overlaps the contents of the first embodiment, the explanation is omitted here.

According to the present embodiment, since it is not necessary to transfer the data indicating no color data, data can be efficiently transferred In the above-mentioned embodiments, the liquid drop jetted from the recording head is ink, and the liquid contained in the ink tank is ink, but the contents are not limited to ink. For example, to enhance the fixation and the waterproofness of a recorded image, or to enhance the image quality, a processing liquid jetted to a record medium can be contained in the ink tank.

The above embodiment comprises means (for example, an electro-heat conversion member, a laser light, etc.) for generating heat energy for use in jetting ink in the inkjet recording system. By use of the system to change the status of ink using the heat energy, data can be recorded with high density and precision.

The typical basic and preferable configuration and principle are disclosed by, for example the U.S. Pat. Nos. 4,723,129 and 4,740,796. The system can be applied to the on-demand type and the continuous type. Especially, in the case of the on-demand type, heat energy is generated in an electro-heat conversion member provided corresponding to a sheet or a liquid path holding a liquid (ink) by applying at least one drive signal corresponding to record information for a sudden temperature rise exceeding the film boil to the electro-heat conversion member so that the film boil can be generated on the heat effect surface of the recording head, thereby effectively generating foam in the liquid (ink) one-to-one corresponding to the drive signal.

By the development and contraction of the foam, the liquid (ink) is jetted through a jet opening, and at least one drop of liquid is formed. When the drive signal forms a pulse, the foam can immediately develop and contract. Therefore, responsive liquid (ink) jet can be generated preferably.

A drive signal of the pulse form is disclosed by U.S. Pat. Nos. 4,463,359 and 4,345,262. Based on the condition described in U.S. Pat. No. 4,313,124 relating to the temperature rise ratio on the heat effect surface, a more preferable recording operation can be realized.

In addition to the configuration of the recording head by a combination of the above-mentioned jet opening, liquid path, and electro-heat conversion member (linear liquid path or right-angle liquid path), the configuration of U.S. Pat. Nos. 4,558,333 and 4,459,600 disclosing the configuration in which a heat effect surface is arranged in the curved area can be included in the present invention. Additionally, Japanese Patent Laid-Open No. 59-123670 disclosing the configuration in which a common slot is used as a jet unit of the electro-heat conversion member for a plurality of electro-heat conversion members, and Japanese Patent Laid-Open No. 59-138461 disclosing the configuration in which an opening for absorbing the pressure wave of heat energy corresponds to the jet unit can be based upon in configuration.

Furthermore, a recording head of a full line type having the length corresponding to the width of the maximum record medium of the recording apparatus can be configured to correspond to the length by a combination with a plurality of recording heads as described above in the specifications, or can be configured as a single recording head designed as an integrated system.

Additionally available is not only a recording head of a cartridge type for which an ink tank is provided as incorporated into the recording head itself as described above, but also a recording head of a chip type which can be freely exchanged for an electrical connection to the body of the apparatus, or a supply of ink from the body of the apparatus when attached to the body of the apparatus.

Additionally, it is preferable to add recovery means, preparatory means, etc. to the recording head in the configuration of the recording apparatus described above because they keep the recording operation more stable. Practical examples can be capping means, cleaning means, pressure or sucking means, an electro-heat conversion member, another heating device, preparatory heating means obtained by combining any of them, etc. It is also effective to provide a preparatory jet mode in which a jetting operation is performed in addition to the recording jet.

Furthermore, the recording mode of the recording apparatus can include not only important colors such as black, etc., but also at least one of different plural colors and full colors using mixed colors depending on integrally configuring the recording head or on a combination of plurality of it.

As described above, according to the embodiments of the present invention, the ink is supposed to be liquid, but the ink solidified at the room temperature or lower, or the ink softened or liquidized at the room temperature can also be available. In the inkjet system, it is common that the temperature is controlled to keep the viscosity of the ink in a stable jet range by adjusting the temperature within the range from 30° C. to 70° C. Therefore, the ink is to be liquid when a use record signal is supplied.

Furthermore, the ink which is solidified in the normal state and liquidized by heating can be applied to prevent the temperature rise by the heat energy by using the heat as the energy for change from the solid state to the liquid stage, or to prevent the evaporation of the ink. In any case, the present invention can be applied to the case in which the ink is liquidized by supplying heat energy depending on the record signal and jetted as liquid ink, and in which the ink liquidized when heat energy is supplied, for example, the ink solidified when it reaches a record medium, is used.

In such cases, the ink can be provided for the electro-heat conversion member in the liquid of solid state in a porous sheet concavity portion or a penetrative hole as described in Japanese Patent Laid-Open Nos. 54-56847 and 60-71260 or U.S. Pat. No. 4,608,577. According to the present invention, the most effective system to each type of the above-mentioned ink is the above-mentioned film boil system.

Additional embodiment of the present invention can be the apparatus incorporated into or independent of the computer as an image output terminal of the information processing equipment, a copier combined with a reader etc., and a facsimile device having the function of transmitting/receiving data.

As many apparently widely different embodiments of the present invention can be made without departing from the spirit and scope thereof, it is to be understood that the invention is not limited to the specific embodiments thereof except as defined in the claims.

What is claimed is:

1. A method for controlling a recording apparatus having a buffer for dividing a storage area into a plurality of areas in a scanning direction of a recording head to record data of a plurality of colors by allowing a carriage loaded with the recording head to scan a record medium, storing the divided image data corresponding to each color of the plurality of colors in a divided area unit, comprising:

a receiving step of receiving information transmitted from external equipment, dividing a record area in the received information into a plurality of areas, and processing data separately between image data in a unit of the divided area and setting information for control of a write and a read of the image data for each color of the plurality of colors;

a setting step of setting information about image data for each color of the plurality of colors in the area unit in a register of a write control unit and a read control unit according to the setting information;

a first controlling step of generating address information for a writing process on the image data in the area unit according to the information for the image data for each color set in the register;

a second controlling step of generating address information for a read of the image data handled in the writing process according to the information for the image data for each color set in the register; and a record data generating step of generating record data for each color in the divided area unit according to the read image data for each color.

2. A computer-executable program executed in computer equipment which can be connected to a printer and realize a printer driver for driving the printer by a default capability through a bidirectional interface, wherein the computer is allowed to perform the control method according to claim 1.

3. A computer-readable storage medium storing a processing step which is performed by computer equipment which can be connected to a printer, and realizes a printer driver for driving the printer by a default capability through a bidirectional interface, wherein a program for executing the control method according to claim 1 in the processing step is stored.

4. A recording apparatus having a buffer for dividing a storage area into a plurality of areas in a scanning direction of a recording head to record data of a plurality of colors by allowing a carriage loaded with the recording head to scan a record medium, storing the divided image data corresponding to each color of the plurality of colors in a divided area unit, comprising:

a write control unit for controlling write address information about image data in the area unit for image data of each color based on information for switch of a data storage area for image data of each color and a result of comparison between an available remainder of the buffer and an update amount of a write address when image data divided in an area unit is stored in the buffer;

a read control unit for controlling read address information for a read of image data stored in the buffer; and record data generation means for generating record data for each color in a unit of the divided area based on the read image data for each color according to the read address information.

5. The recording apparatus according to claim 4, wherein said write control unit updates address information in a color data unit upon receipt of information for switch of the storage area.

6. The recording apparatus according to claim 4, wherein said write control unit comprises a comparator for comparing write address information to be updated with read address information; suspends updating write address information when the write address information is equal to or larger than ($\geq$) the read address information as a result of the comparison; and updates the write address information when said read control unit updates the read address information and the write address information is smaller than (>) the read address information.

7. The recording apparatus according to claim 4, wherein said write control unit updates the write address information and allows a data write for data of each color when the remainder of the buffer is equal to or larger than ($\geq$) the update amount of the write address, and does not update the write address information and prohibits a data write for data of each color when the remainder of the buffer is smaller (>) than the update amount of the write address.

8. The recording apparatus according to claim 4, wherein the divided image data in an area unit includes image data of cyan, yellow, magenta, and black.

9. The recording apparatus according to claim 4, wherein the buffer stores the image data cyclically among areas set according to leading address information and trailing address information.

10. The recording apparatus according to claim 4, wherein the size of the buffer depends on the number of nozzles recorded in a next horizontal scanning by the recording head and width information about the divided record area.

11. The recording apparatus according to claim 4, wherein
    the number of pieces of data stored in the buffer is equal to the number of pieces of data in a record area smaller than a record area of one scanning operation.

12. The recording apparatus according to claim 4, wherein
    the recording head is an inkjet recording head for jetting ink for recording.

13. The recording apparatus according to claim 12, wherein
    the recording head jets ink using heat energy, and comprises a heat energy conversion member for generation of heat energy to be supplied to ink.

14. A method for controlling a recording apparatus having a buffer for dividing a storage area into a plurality of areas in a scanning direction of a recording head to record data of a plurality of colors by allowing a carriage loaded with the recording head to scan a record medium, storing the divided image data corresponding to each color of the plurality of colors in a divided area unit, comprising:

a write controlling step of controlling write address information about image data for each color of the plurality of colors in the area unit for data of each color based on information for switch of a data storage area for data of each color and a result of comparison between an available remainder of the buffer and an update amount of a write address when image data divided in an area unit is stored in the buffer;

a read controlling step of controlling read address information for a read of image data stored in the buffer; and a record data generating step of generating record data for each color in a unit of the divided area based on the read image data for each color according to the read address information.

15. A computer-executable program executed in computer equipment which can be connected to a printer and realize a printer driver for driving the printer by a default capability through a bidirectional interface, wherein
    the computer is allowed to perform the control method according to claim 14.

16. A computer-readable storage medium storing a processing step which is performed by computer equipment which can be connected to a printer, and realizes a printer driver for driving the printer by a default capability through a bidirectional interface, wherein
    a program for executing the control method according to claim 14, in the processing step is stored.

* * * * *

UNITED STATES PATENT AND TRADEMARK OFFICE
CERTIFICATE OF CORRECTION

PATENT NO. : 7,284,811 B2
APPLICATION NO. : 10/413146
DATED : October 23, 2007
INVENTOR(S) : Tanaka et al.

It is certified that error appears in the above-identified patent and that said Letters Patent is hereby corrected as shown below:

IN THE DRAWINGS:
Sheet 8, FIG. 7B, "hight" (all occurrences) should read --height--.
Sheet 13, FIG. 10, "hight" (all occurrences) should read --height--.

COLUMN 2:
Line 54, "Buffer" should read --buffer--.

COLUMN 3:
Line 53, "cartridge IJH" should read --cartridge IJC--.

COLUMN 4:
Line 58, "a"command" (204)" should read --a "command" (204)--, and "a"data" should read --a "data"--.

COLUMN 5:
Line 14, "two nozzle" should read --a two nozzle--.
Line 17, "two nozzle" should read --the two nozzle--.
Line 52, "expanding(storing)" should read --expanding (storing)--.

COLUMN 6:
Line 27, "recording" should read --the recording--.
Line 42, "(referred to" should read --(referred to as--, and "data)" should read --data).--.
Line 67, "no more" should read --any more--.

COLUMN 7:
Line 43, "Furthermore, then" should read --Furthermore, when--.
Line 58, "line s805," should read --line S805,--.

COLUMN 8:
Line 17, "describe" should read --described--.
Line 35, "(S901)" should read --(S901).--.
Line 46, "no the data" should read --no more data--.
Line 48, "no data cannot" should read --no more data can--.

UNITED STATES PATENT AND TRADEMARK OFFICE
CERTIFICATE OF CORRECTION

PATENT NO. : 7,284,811 B2
APPLICATION NO. : 10/413146
DATED : October 23, 2007
INVENTOR(S) : Tanaka et al.

It is certified that error appears in the above-identified patent and that said Letters Patent is hereby corrected as shown below:

COLUMN 9:
Line 25, "the write" should read --writing--.

COLUMN 12:
Line 11, "hight" should read --height--.
Line 25, "stores" should read --store--.

COLUMN 13:
Line 21, "recorded" should read --is recorded--.
Line 28, "shown FIG. 11." should read --as shown in FIG. 11--.
Line 29, "to in" should read --to--.
Line 33, "and the" should read --or--.
Line 39, "is not" should read --are not--.
Line 60, "cleared, if" should read --cleared. If--.

COLUMN 14:
Line 22, "step S 1404," should read --step S1404,--.
Line 38, "whether of not" should read --whether or not--.

COLUMN 15:
Line 49, "plurality of area" should read --plurality of areas--.

COLUMN 17:
Line 34, "how to" should read --how--.

COLUMN 18:
Line 3, "(next,block,adr)" should read --(next_block_adr)--.
Line 24, "(next13 block13 adr)" should read --(next_block_adr)--.
Line 35, "transferred" should read --transferred.--.

UNITED STATES PATENT AND TRADEMARK OFFICE
CERTIFICATE OF CORRECTION

PATENT NO. : 7,284,811 B2 Page 3 of 3
APPLICATION NO. : 10/413146
DATED : October 23, 2007
INVENTOR(S) : Tanaka et al.

It is certified that error appears in the above-identified patent and that said Letters Patent is hereby corrected as shown below:

COLUMN 19:
Line 19, "in" should read --its--.

COLUMN 21:
Line 31, "smaller than (>)" should read --smaller than (<)--.
Line 40, "smaller (>)" should read --smaller (<)--.

Signed and Sealed this

Tenth Day of March, 2009

JOHN DOLL
*Acting Director of the United States Patent and Trademark Office*